(12) United States Patent
Ould-Ahmed-Vall

(10) Patent No.: US 10,338,920 B2
(45) Date of Patent: *Jul. 2, 2019

(54) INSTRUCTIONS AND LOGIC FOR GET-MULTIPLE-VECTOR-ELEMENTS OPERATIONS

(71) Applicant: Intel Corporation, Santa Clara, CA (US)

(72) Inventor: Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 14/975,098

(22) Filed: Dec. 18, 2015

(65) Prior Publication Data

US 2017/0177353 A1   Jun. 22, 2017

(51) Int. Cl.
*G06F 9/30* (2018.01)

(52) U.S. Cl.
CPC ............ *G06F 9/30036* (2013.01); *G06F 9/30* (2013.01); *G06F 9/3016* (2013.01); *G06F 9/30018* (2013.01); *G06F 9/30101* (2013.01)

(58) Field of Classification Search
CPC .................................................. G06F 9/30036
See application file for complete search history.

(56) References Cited

U.S. PATENT DOCUMENTS

| 4,777,593 A | 10/1988 | Yoshida |
| 5,991,531 A | 11/1999 | Song et al. |

(Continued)

FOREIGN PATENT DOCUMENTS

| WO | 2017105713 A1 | 6/2017 |
| WO | 2017105716 A1 | 6/2017 |

(Continued)

OTHER PUBLICATIONS

International Search Report and Written Opinion for PCT Patent Application No. PCT/US2016/061962, dated Feb. 21, 2017; 10 pages.

(Continued)

*Primary Examiner* — Aimee Li
*Assistant Examiner* — William V Nguyen
(74) *Attorney, Agent, or Firm* — Alliance IP, LLC

(57) ABSTRACT

A processor includes an execution unit to execute instructions to get data elements of the same type from multiple data structures packed in vector registers. The execution unit includes logic to extract data elements from specific positions within each data structure dependent on an instruction encoding. A vector GET3 instruction encoding specifies that data elements be extracted from the first, second, or third position in each XYZ-type data structure. A vector GET4 instruction encoding specifies that data elements be extracted from the first, second, third, or fourth position in each XYZW-type data structure and that the extracted data elements be placed in the upper or lower half of a destination vector. The execution unit includes logic to place the extracted data elements in contiguous locations in the destination vector. The execution unit includes logic to store the destination vector to a destination vector register specified in the instruction.

20 Claims, 34 Drawing Sheets

OPERATION OF A "VPGET3XD (REG, REG, REG)" INSTRUCTION

(56) References Cited

U.S. PATENT DOCUMENTS

| | | | |
|---|---|---|---|
| 6,266,758 | B1 | 7/2001 | Hook et al. |
| 6,954,841 | B2 | 10/2005 | Moreno et al. |
| 2004/0073779 | A1 | 4/2004 | Hokenek et al. |
| 2006/0184765 | A1 | 8/2006 | Krueger |
| 2006/0227966 | A1 | 10/2006 | Knowles |
| 2008/0114824 | A1 | 5/2008 | Mejdrich et al. |
| 2009/0300331 | A1 | 12/2009 | Gschwind et al. |
| 2010/0274988 | A1 | 10/2010 | Mimar |
| 2012/0278591 | A1 | 11/2012 | Hiker et al. |
| 2013/0212360 | A1 | 8/2013 | Sperber et al. |
| 2013/0275729 | A1 | 10/2013 | Abraham et al. |
| 2013/0275730 | A1 | 10/2013 | Ould-Ahmed-Vall et al. |
| 2014/0013075 | A1 | 1/2014 | Hagog et al. |
| 2014/0059323 | A1 | 2/2014 | Fridman et al. |
| 2014/0181464 | A1* | 6/2014 | Forsyth .............. G06F 9/30018 711/214 |
| 2014/0189295 | A1 | 7/2014 | Uliel et al. |
| 2014/0223138 | A1 | 8/2014 | Ould-Ahmed-Vall et al. |
| 2014/0258683 | A1 | 9/2014 | Ould-Ahmed-Vall et al. |
| 2014/0289503 | A1 | 9/2014 | Toll et al. |
| 2014/0372727 | A1 | 12/2014 | Valentine et al. |
| 2017/0031865 | A1* | 2/2017 | Eyole .................. G06F 15/8076 |
| 2017/0177351 | A1 | 6/2017 | Duld-Ahmed-Vall |
| 2017/0177352 | A1 | 6/2017 | Ould-Ahmed-Vall |
| 2017/0177359 | A1 | 6/2017 | Ould-Ahmed-Vall |

FOREIGN PATENT DOCUMENTS

| | | | |
|---|---|---|---|
| WO | 2017105717 | A1 | 6/2017 |
| WO | 2017112177 | A1 | 6/2017 |

OTHER PUBLICATIONS

Intel Corporation, IA-32 Intel® Architecture Software Developer's Manual—vol. 2: Instruction Set Reference, 978 pages, 2003.

Final Rejection of U.S. Appl. No. 14/974,319 dated Aug. 14, 2018, 17 pages.
Final Rejection of U.S. Appl. No. 14/974,445 dated Jun. 13, 2018, 16 pages.
Final Rejection of U.S. Appl. No. 14/977,443 dated Jul. 23, 2018, 27 pages.
Non-Final Office Action in U.S. Appl. Np. 14/974,445 dated Nov. 28, 2018.
Non-Final Rejection of U.S. Appl. No. 14/974,319 dated Nov. 30, 2017, 23 pages.
Non-Final Rejection of U.S. Appl. No. 14/974,445 dated Dec. 14, 2017, 22 pages.
Non-Final Rejection of U.S. Appl. No. 14/977,443 dated Nov. 30, 2017, 37 pages.
PCT International Preliminary Report on Patentability in International Application No. PCT/US2016/061960 dated Jun. 19, 2018, 9 pages.
PCT International Preliminary Report on Patentability in International Application No. PCT/US2016/061962, dated Jun. 19, 2018, 6 pages.
PCT International Preliminary Report on Patentability in International Application No. PCT/US2016/062712 dated Jun. 26, 2018, 6 pages.
PCT International Preliminary Report on Patentability in PCT International Application No. PCT/US2016/061955 dated Jun. 19, 2018.
PCT International Search Report and Written Opinion in International Application No. PCT/US2016/062712 dated Mar. 6, 2017, 10 pages.
PCT International Search Report and Written Opinion of PCT Patent Application No. PCT/US20161061955, dated Feb. 14, 2017, 11 pages.
PCT International Search Report and Written Opinion of PCT Patent Application No. PCT/US2016/61960, dated Feb. 14, 2017; 13 pages.

* cited by examiner

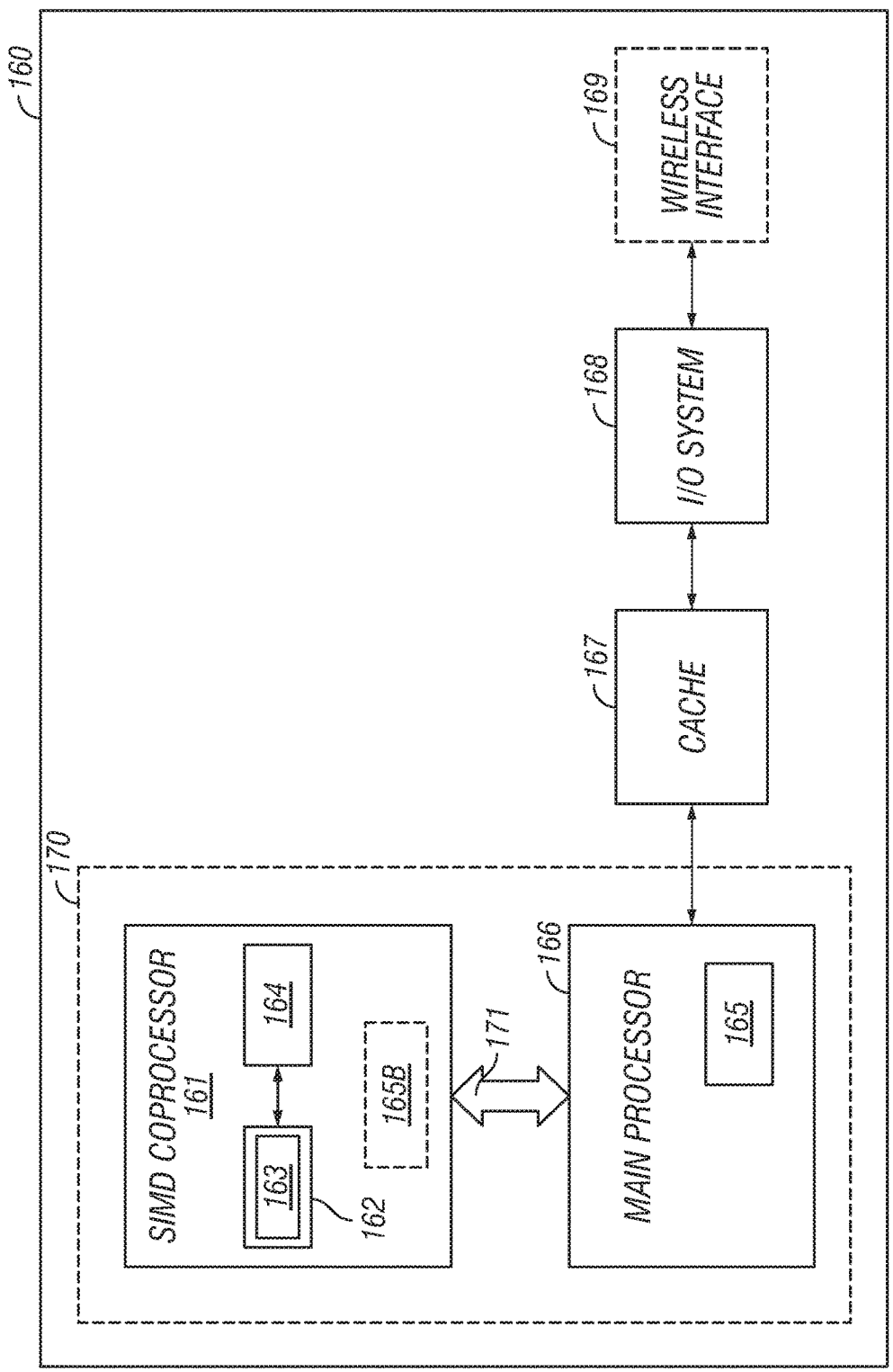

| 127 | 112 111 | 96 95 | 80 79 | 64 63 | 48 47 | 32 31 | 16 15 | 0 |
|---|---|---|---|---|---|---|---|---|
| HALF 7 | HALF 6 | HALF 5 | HALF 4 | HALF 3 | HALF 2 | HALF 1 | HALF 0 | |

PACKED HALF
341

| 127 | 96 95 | 64 63 | 32 31 | 0 |
|---|---|---|---|---|
| SINGLE 3 | SINGLE 2 | SINGLE 1 | SINGLE 0 | |

PACKED SINGLE
342

| 127 | 64 63 | 0 |
|---|---|---|
| DOUBLE 1 | DOUBLE 0 | |

PACKED DOUBLE
343

FIG. 3B

```
 127   120 119  112 111  104 103              24 23   16 15    8 7      0
| bbbb bbbb | bbbb bbbb | bbbb bbbb |  • • •  | bbbb bbbb | bbbb bbbb | bbbb bbbb |
```
UNSIGNED PACKED BYTE REPRESENTATION 344

```
 127   120 119  112 111  104 103              24 23   16 15    8 7      0
| sbbb bbbb | sbbb bbbb | sbbb bbbb |  • • •  | sbbb bbbb | sbbb bbbb | sbbb bbbb |
```
SIGNED PACKED BYTE REPRESENTATION 345

```
 127           112 111                              16 15              0
| wwww wwww wwww wwww |        • • •            | wwww wwww wwww wwww |
```
UNSIGNED PACKED WORD REPRESENTATION 346

```
 127           112 111                              16 15              0
| swww wwww wwww wwww |        • • •            | swww wwww wwww wwww |
```
SIGNED PACKED WORD REPRESENTATION 347

```
 127                              92 91   32 31                        0
| dddd dddd dddd dddd dddd dddd dddd dddd | • • • | dddd dddd dddd dddd dddd dddd dddd dddd |
```
UNSIGNED PACKED DOUBLEWORD REPRESENTATION 348

```
 127                              92 91   32 31                        0
| sddd dddd dddd dddd dddd dddd dddd dddd | • • • | sddd dddd dddd dddd dddd dddd dddd dddd |
```
SIGNED PACKED DOUBLEWORD REPRESENTATION 349

| 511 | 256 255 | 128 127 | 0 |
|---|---|---|---|
| ZMM0 | | YMM0 | XMM0 |
| ZMM1 | | YMM1 | XMM1 |
| ZMM2 | | YMM2 | XMM2 |
| ZMM3 | | YMM3 | XMM3 |
| ZMM4 | | YMM4 | XMM4 |
| ZMM5 | | YMM5 | XMM5 |
| ZMM6 | | YMM6 | XMM6 |
| ZMM7 | | YMM7 | XMM7 |
| ZMM8 | | YMM8 | XMM8 |
| ZMM9 | | YMM9 | XMM9 |
| ZMM10 | | YMM10 | XMM10 |
| ZMM11 | | YMM11 | XMM11 |
| ZMM12 | | YMM12 | XMM12 |
| ZMM13 | | YMM13 | XMM13 |
| ZMM14 | | YMM14 | XMM14 |
| ZMM15 | | YMM15 | XMM15 |
| ZMM16 | | YMM16 | XMM16 |
| ZMM17 | | YMM17 | XMM17 |
| ZMM18 | | YMM18 | XMM18 |
| ZMM19 | | YMM19 | XMM19 |
| ZMM20 | | YMM20 | XMM20 |
| ZMM21 | | YMM21 | XMM21 |
| ZMM22 | | YMM22 | XMM22 |
| ZMM23 | | YMM23 | XMM23 |
| ZMM24 | | YMM24 | XMM24 |
| ZMM25 | | YMM25 | XMM25 |
| ZMM26 | | YMM26 | XMM26 |
| ZMM27 | | YMM27 | XMM27 |
| ZMM28 | | YMM28 | XMM28 |
| ZMM29 | | YMM29 | XMM29 |
| ZMM30 | | YMM30 | XMM30 |
| ZMM31 | | YMM31 | XMM31 |

*FIG. 20*

OPERATION OF A "VPGET3XD (REG, REG, REG)" INSTRUCTION

OPERATION OF A "VPGET3XD kn z (REG, REG,REG)" INSTRUCTION

OPERATION OF A "VPGET4XD (REG, REG, REG, 0)" INSTRUCTION

OPERATION OF A "VPGET4XD (REG, REG, REG, 8)" INSTRUCTION

US 10,338,920 B2

INSTRUCTIONS AND LOGIC FOR GET-MULTIPLE-VECTOR-ELEMENTS OPERATIONS

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Instructions as they are received on a processor may be decoded into terms or instruction words that are native, or more native, for execution on the processor. Processors may be implemented in a system on chip. Data structures that are organized in tuples of three or four elements may be used in media applications, High Performance Computing applications, and molecular dynamics applications.

DESCRIPTION OF THE FIGURES

Embodiments are illustrated by way of example and not limitation in the Figures of the accompanying drawings:

FIG. 1C illustrates other embodiments of a data processing system for performing text string comparison operations;

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

FIG. 20 is a block diagram illustrating an example extended vector register file, in accordance with embodiments of the present disclosure;

DETAILED DESCRIPTION

Figure 1A:
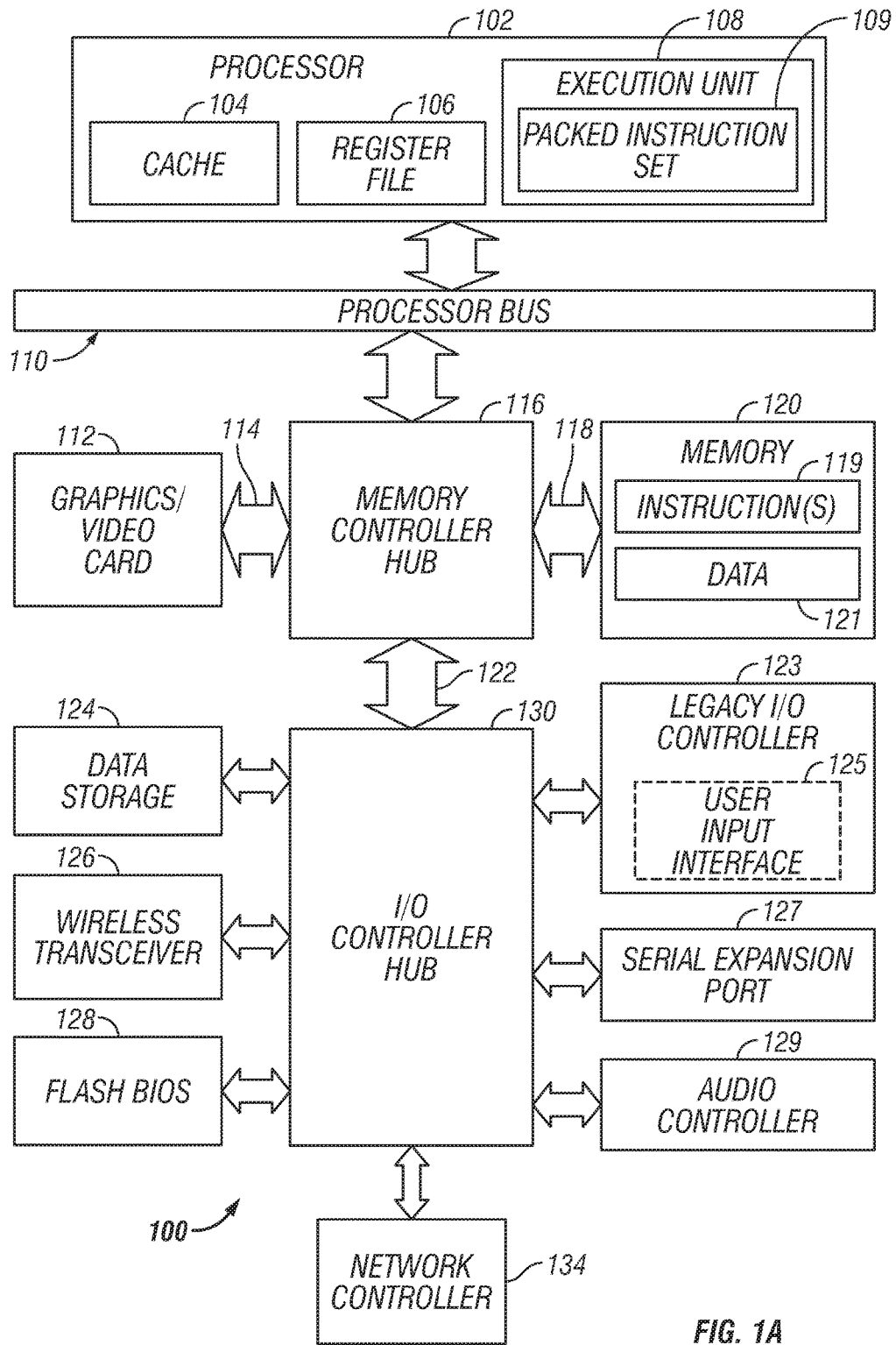
FIG. 1A is a block diagram of an exemplary computer system formed with a processor that may include execution units to execute an instruction, in accordance with embodiments of the present disclosure.

The following description describes instructions and processing logic for performing operations to get multiple vector elements on a processing apparatus. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
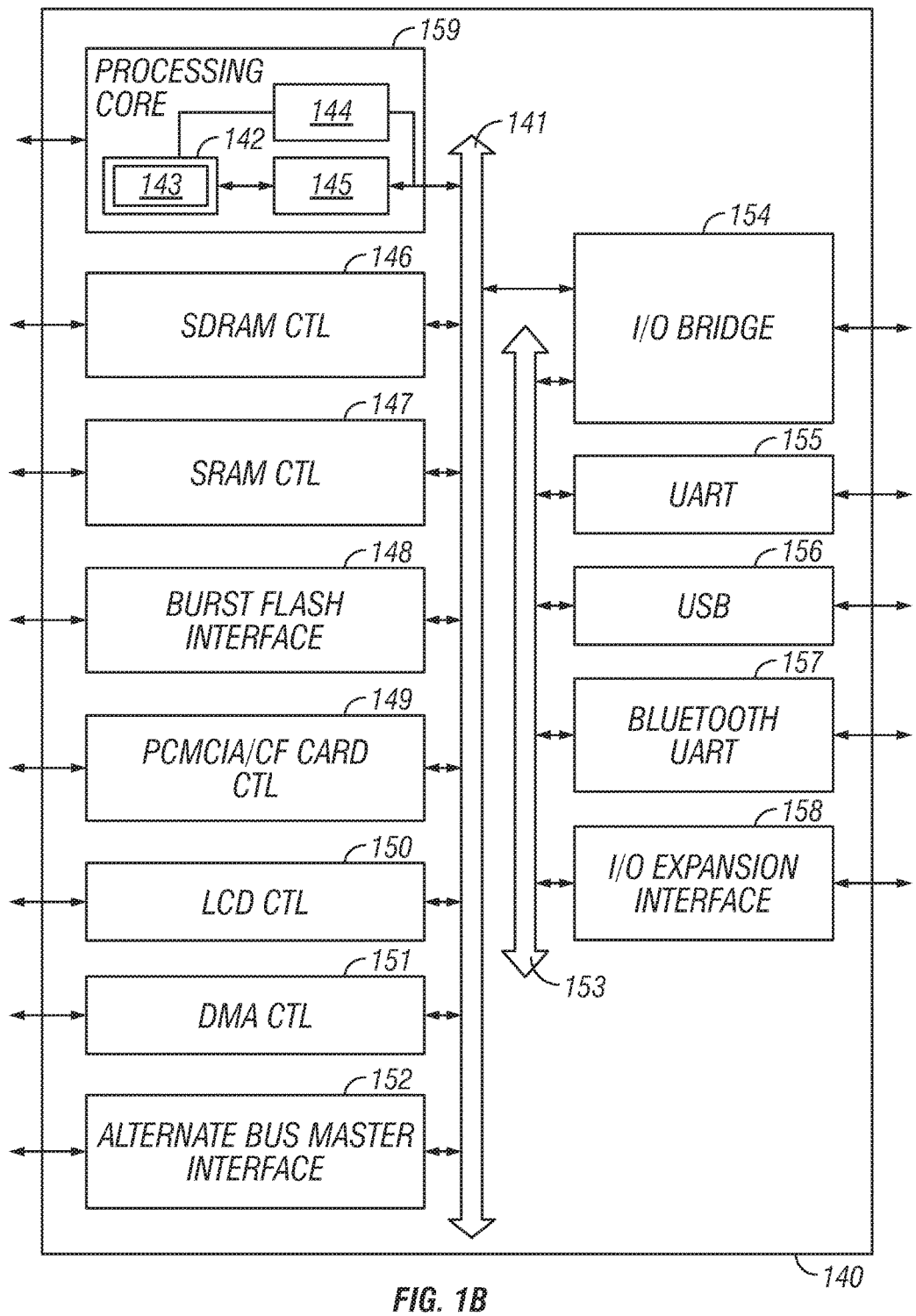
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
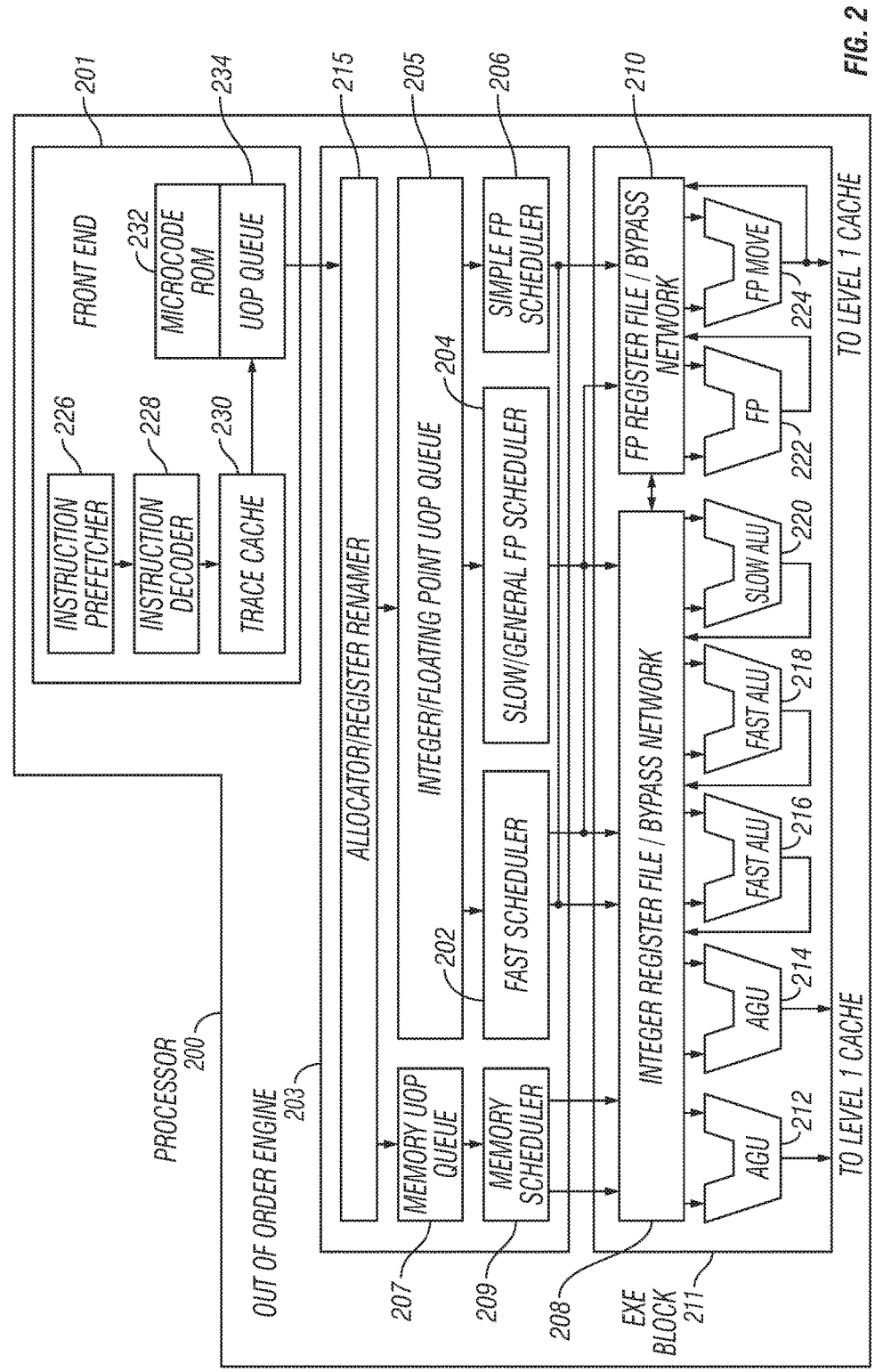
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic in allocator/register renamer 215 allocates the machine buffers and resources that each uop needs in order to execute. The register renaming logic in allocator/register renamer 215 renames logic registers onto entries in a register file. The allocator 215 also allocates an entry for each uop in one of the two uop queues, one for memory operations (memory uop queue 207) and one for non-memory operations (integer/floating point uop queue 205), in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX' registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point data may be contained in the same register file or different register files. Furthermore, in one embodiment, floating point and integer data may be stored in different registers or the same registers.

Figure 3A:
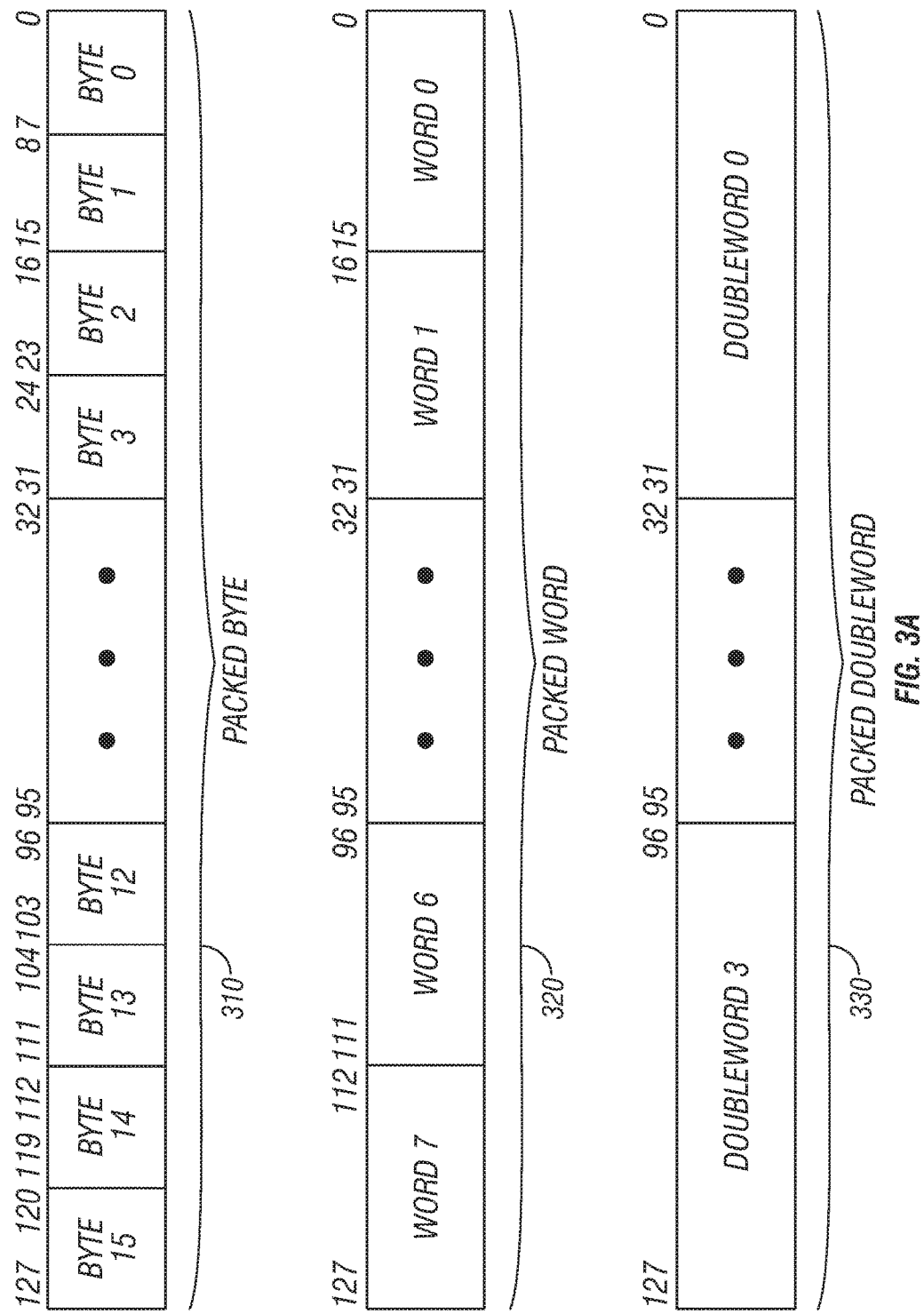
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figures 3D, 3E, 3F:
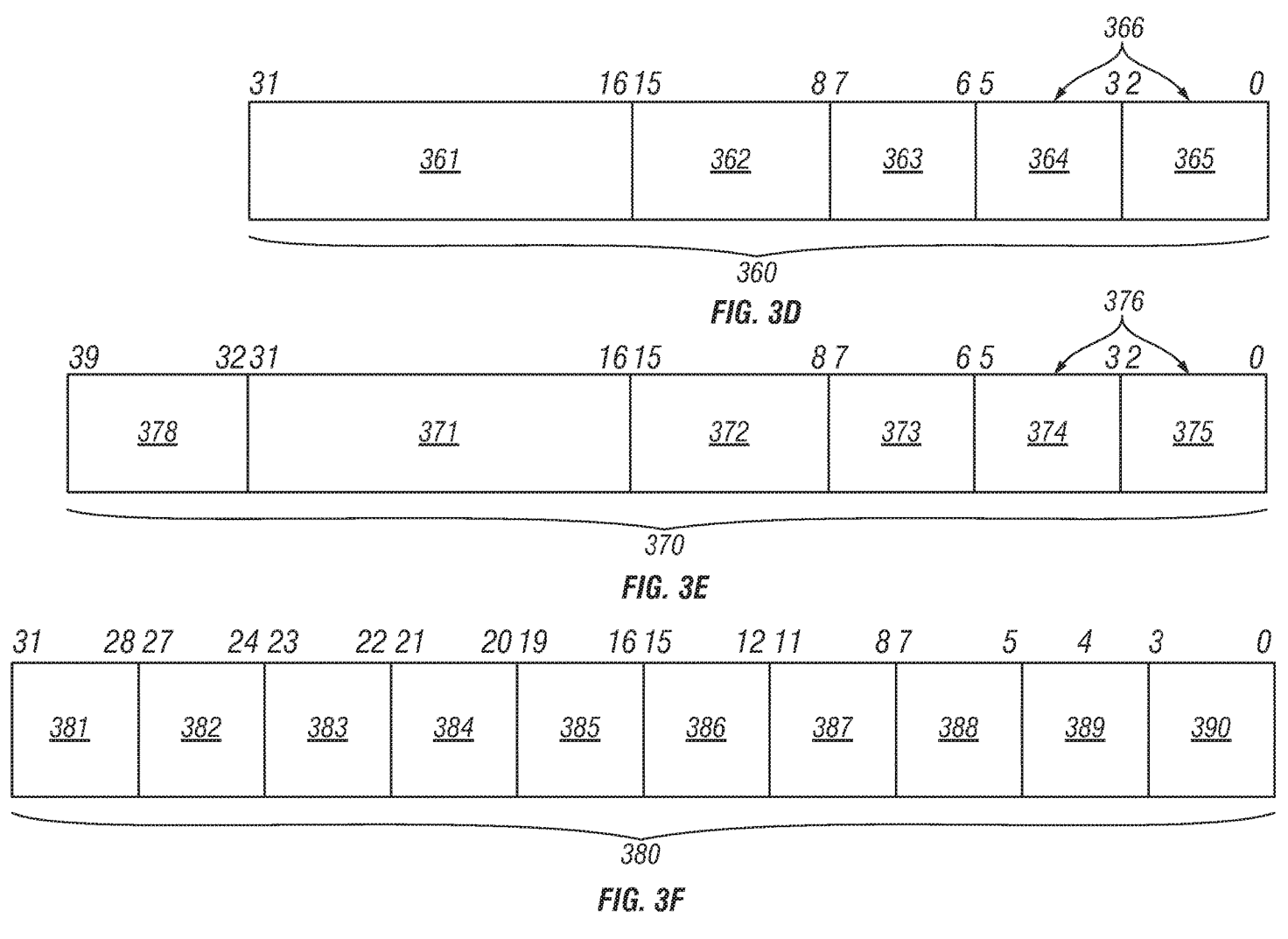

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
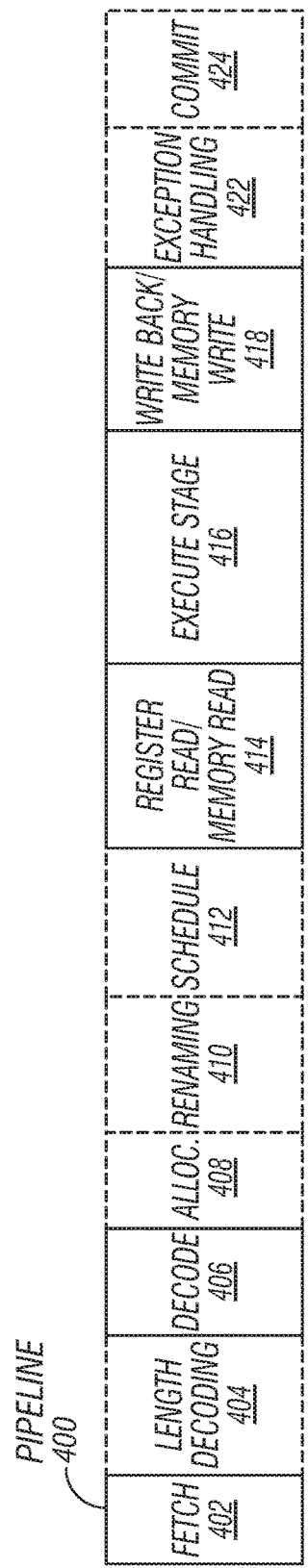
FIG. 4A is a block diagram illustrating an in-order pipeline and a register renaming stage, out-of-order issue/execution pipeline, in accordance with embodiments of the present disclosure.
Figure 4B:
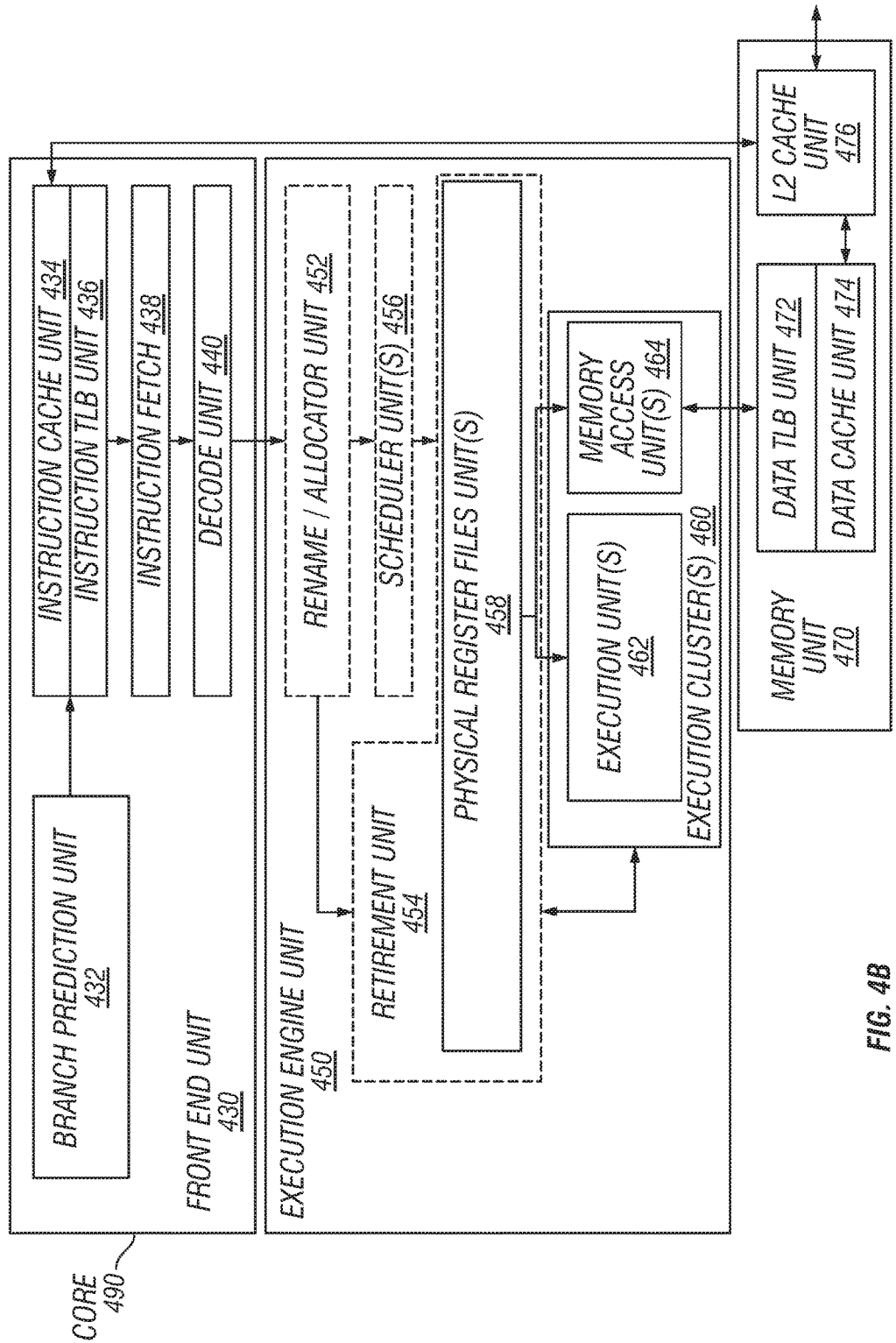
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 454 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 462 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the caches may be external to the core and/or the processor.

Figure 5A:
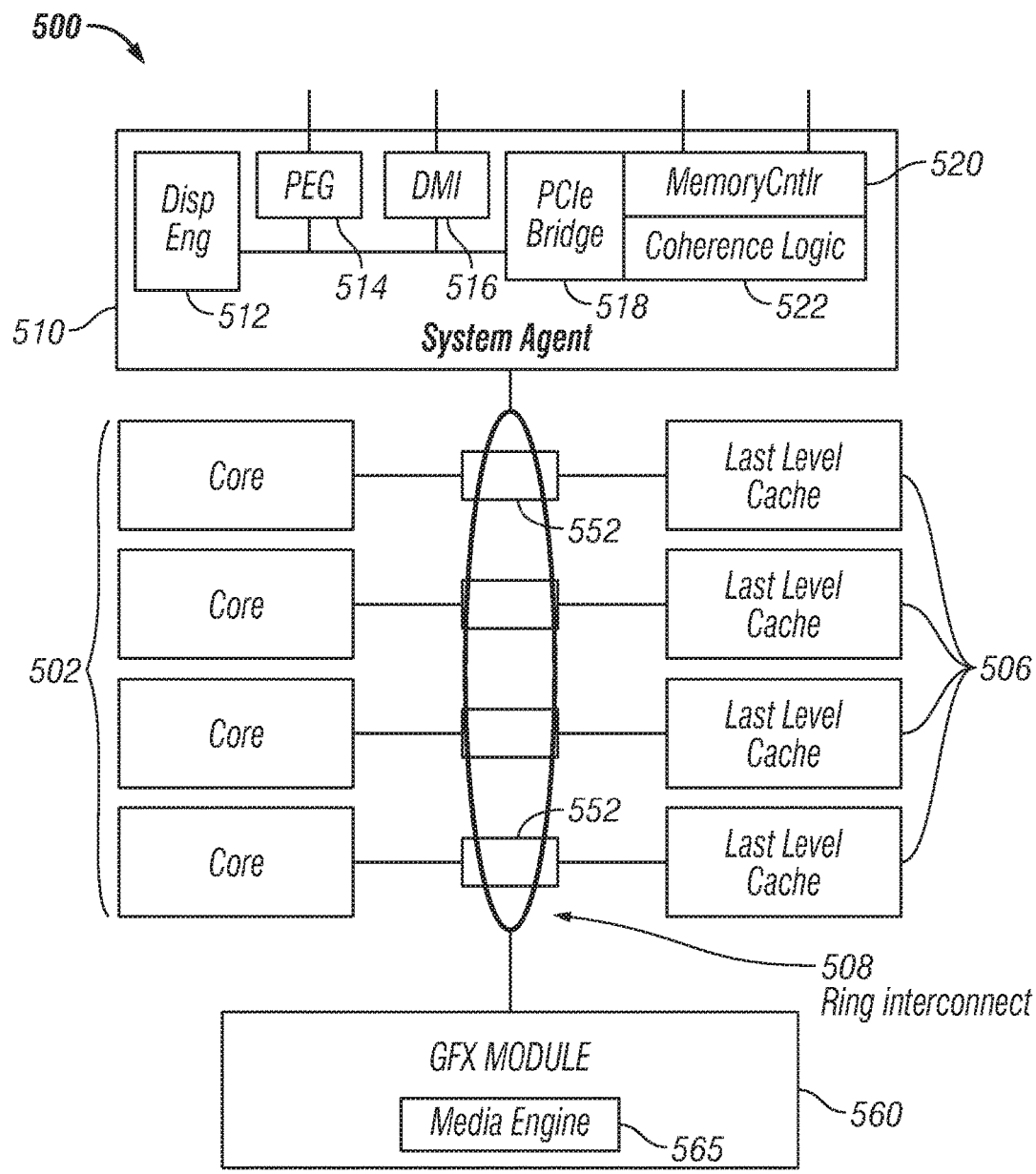
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 514 for communications busses for graphics. In one embodiment, interface 514 may be implemented by PCI Express (PCIe). In a further embodiment, interface 514 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
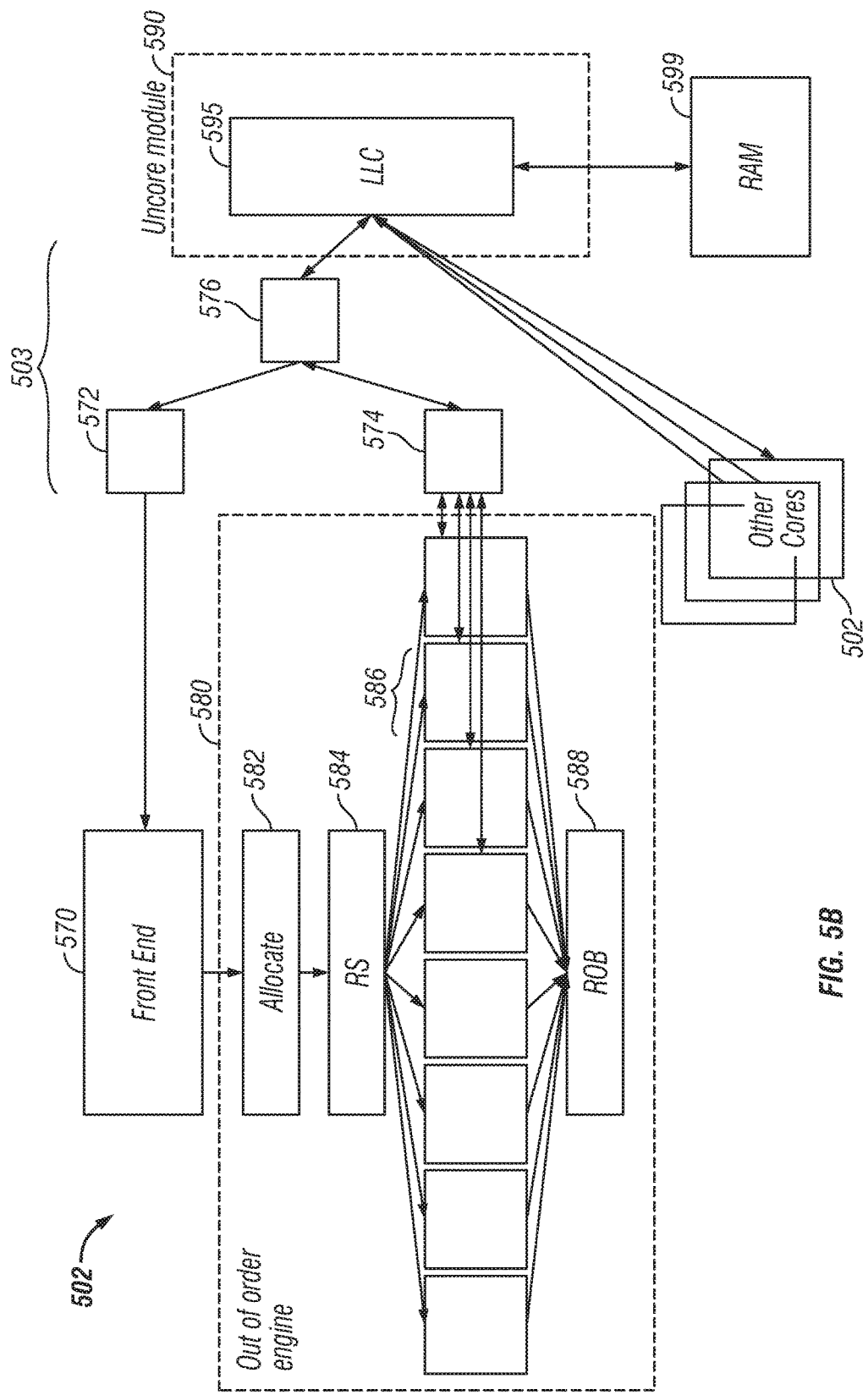
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
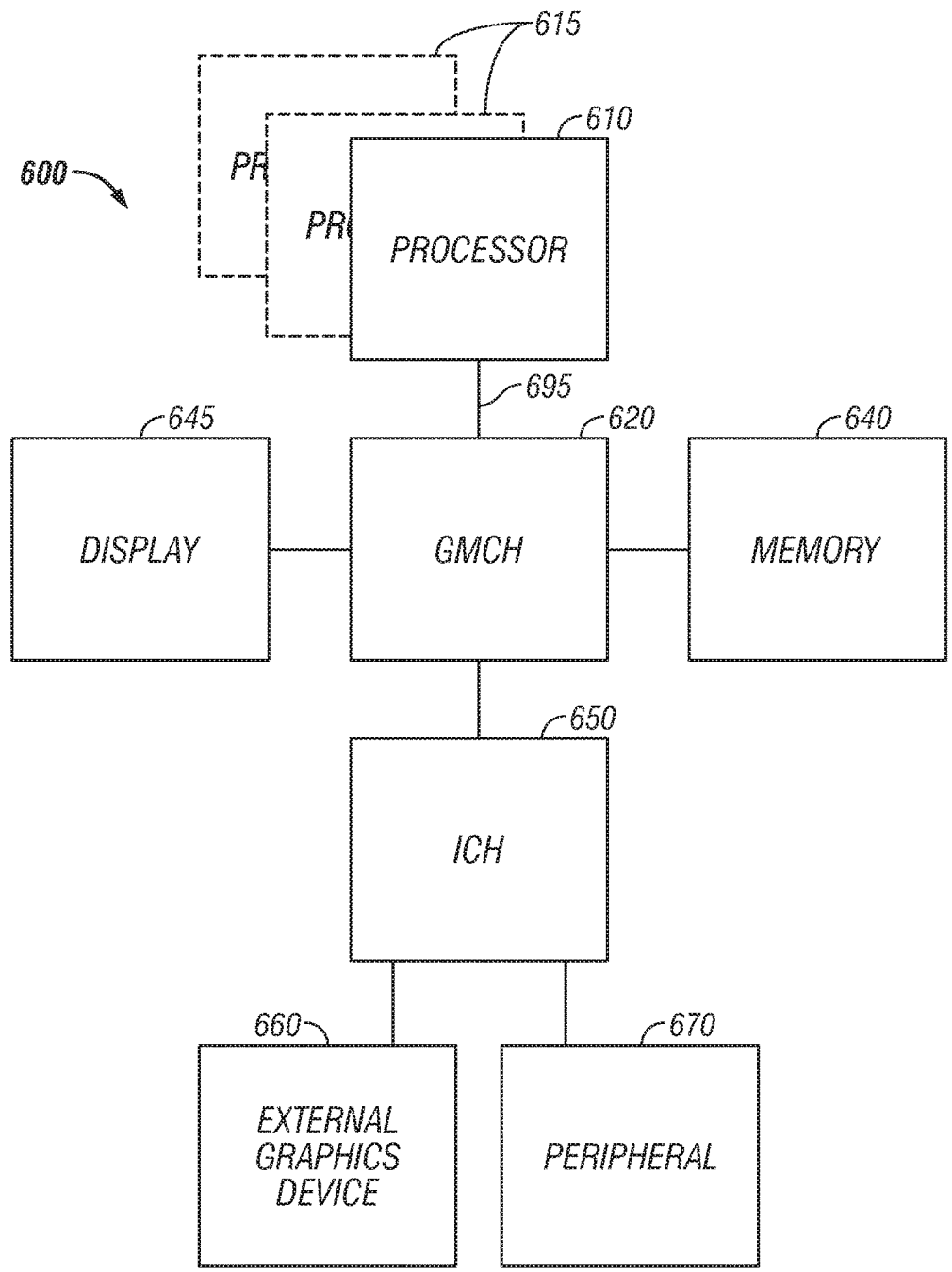
FIG. 6 is a block diagram of a system, in accordance with embodiments of the present disclosure.
Figure 7:
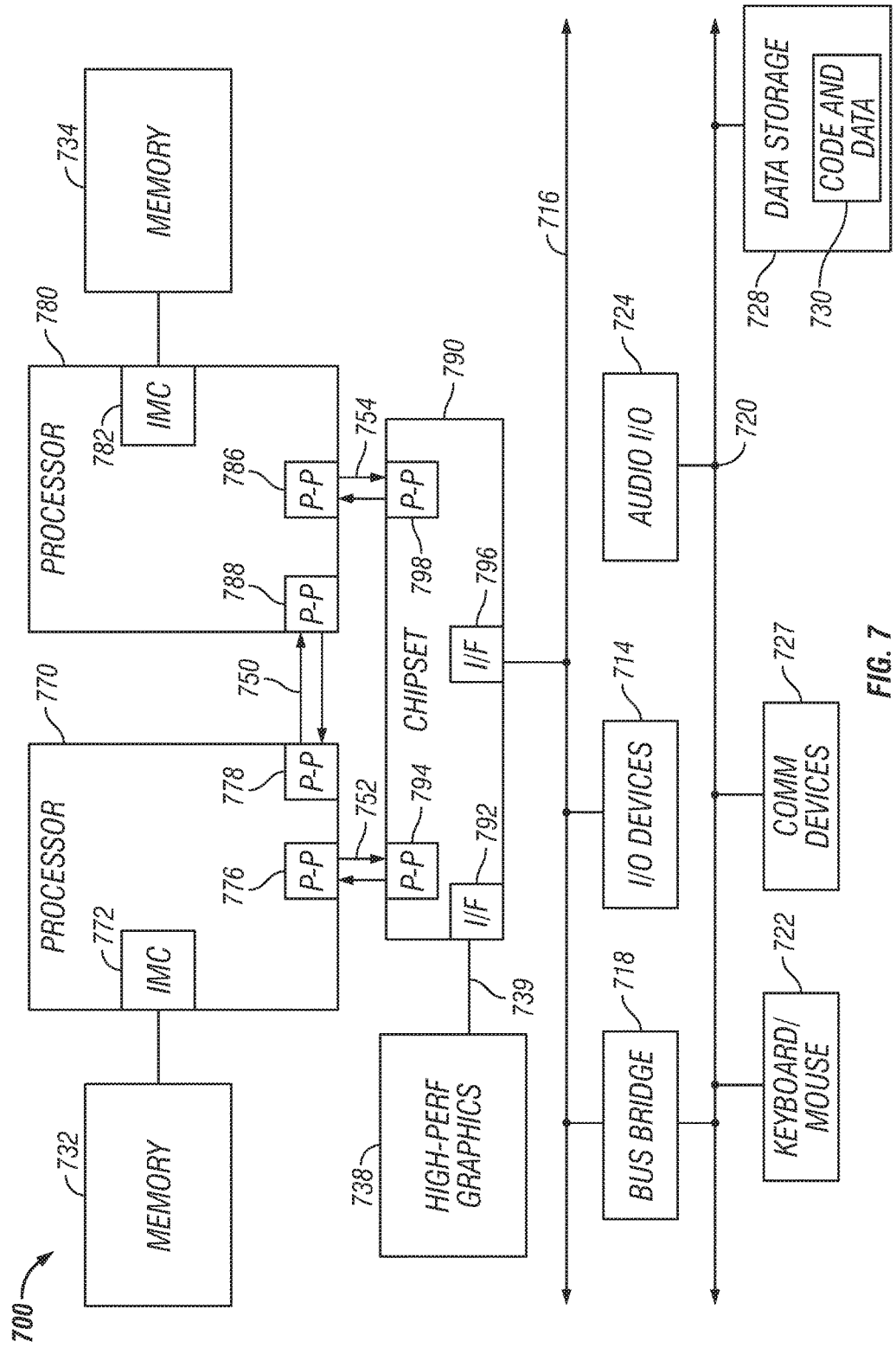
FIG. 7 is a block diagram of a second system, in accordance with embodiments of the present disclosure.
Figure 8:
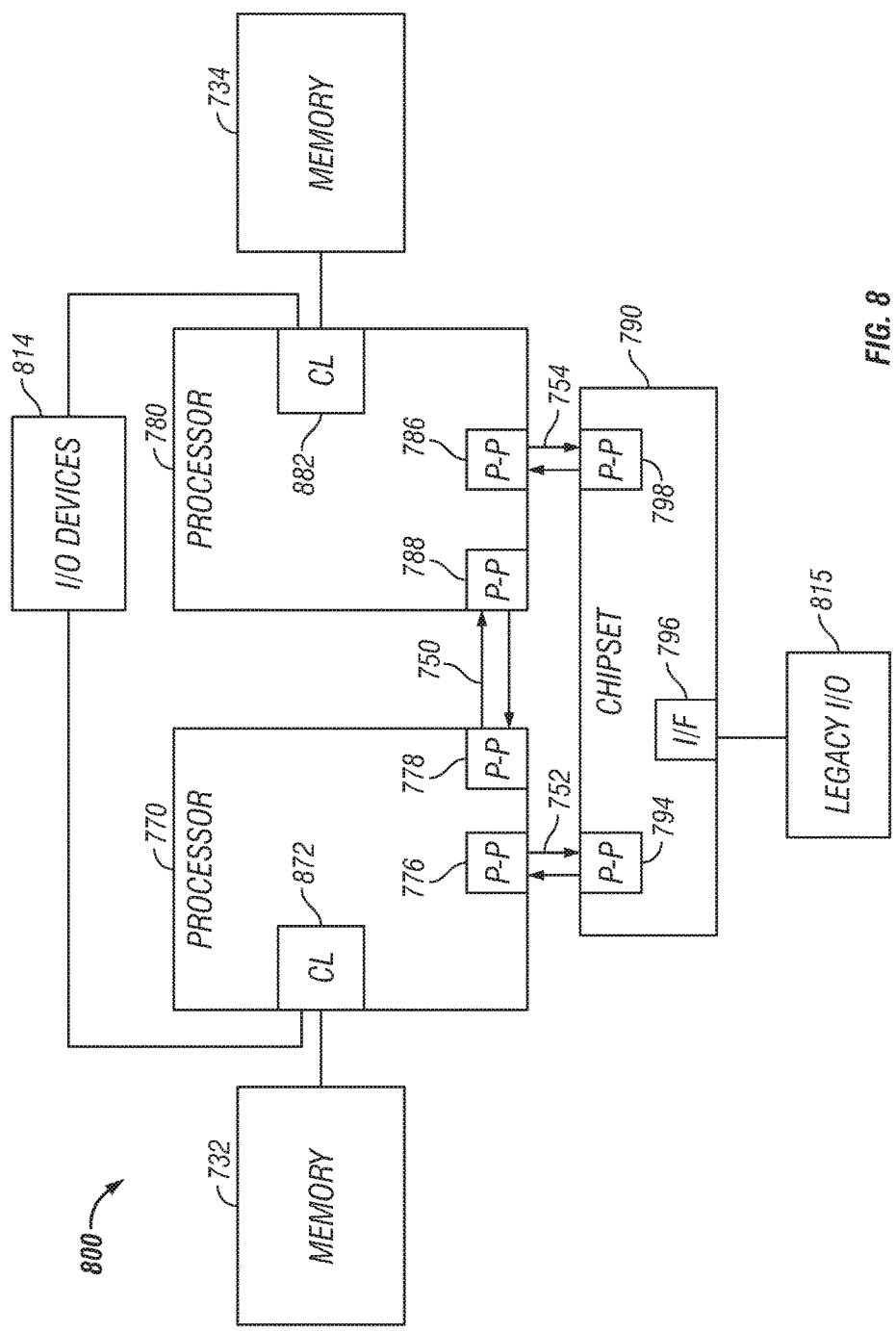
FIG. 8 is a block diagram of a third system in accordance with embodiments of the present disclosure.
Figure 9:
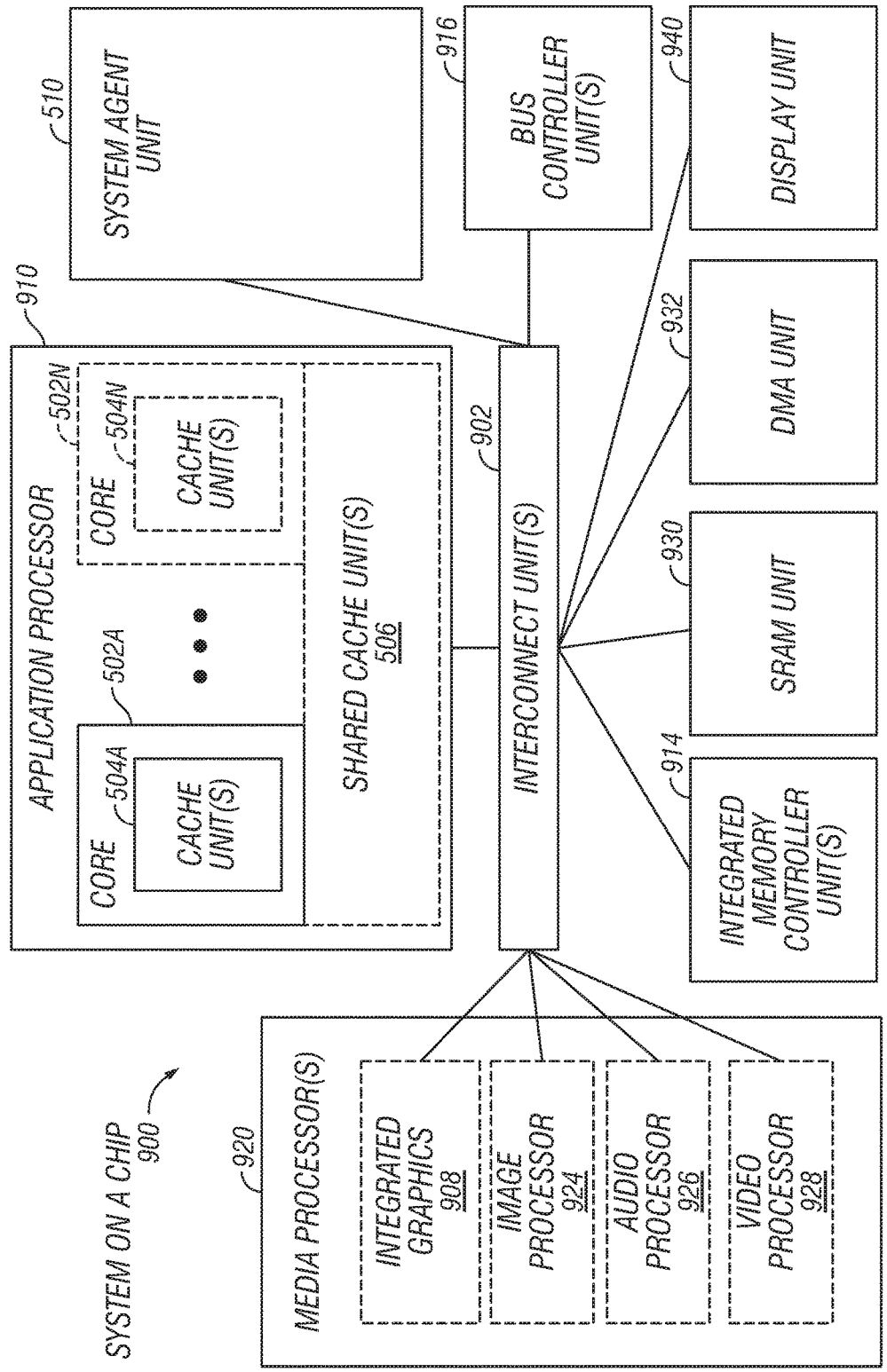
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610, 615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 872 and 882, respectively. For at least one embodiment, CL 872, 882 may include integrated memory controller units such as that described above in connection with FIGS. 5 and 7. In addition. CL 872, 882 may also include I/O control logic. FIG. 8 illustrates that not only memories 732, 734 may be coupled to CL 872, 882, but also that I/O devices 814 may also be coupled to control logic 872, 882. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 510; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
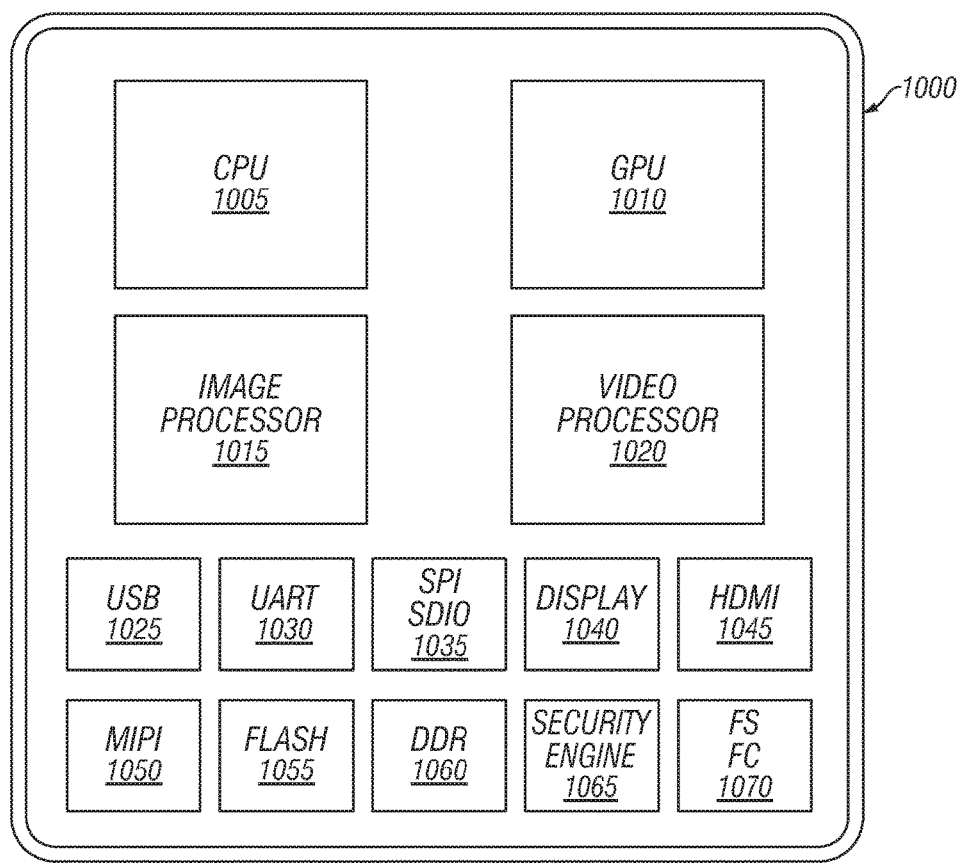
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
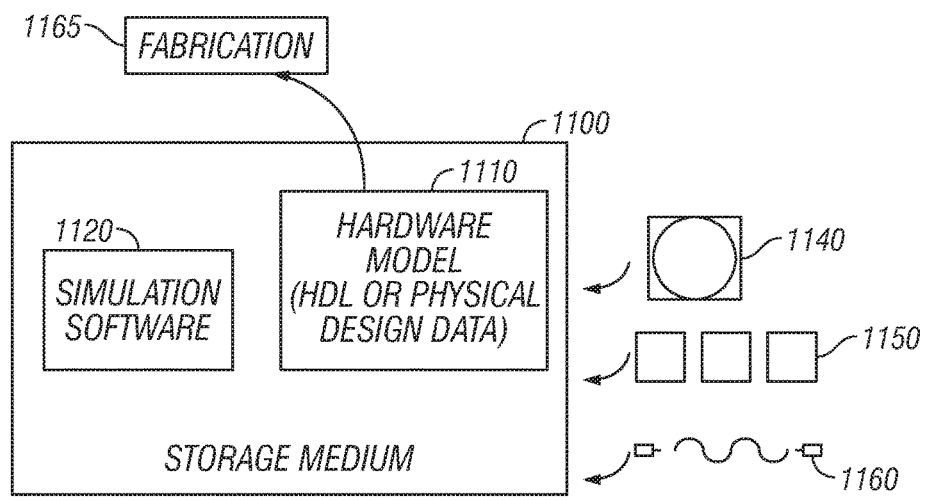
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1100 may include simulation software 1120 and/or hardware or software model 1110. In one embodiment, the data representing the IP core design may be provided to storage 1100 via memory 1140 (e.g., hard disk), wired connection (e.g., internet) 1150 or wireless connection 1160. The IP core information generated by the simulation tool and model may then be transmitted to a fabrication facility 1165 where it may be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
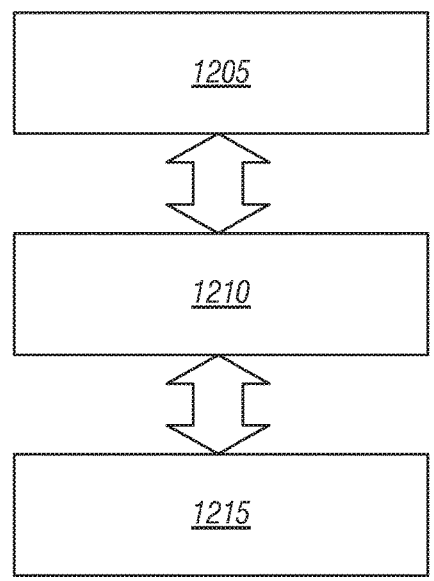
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
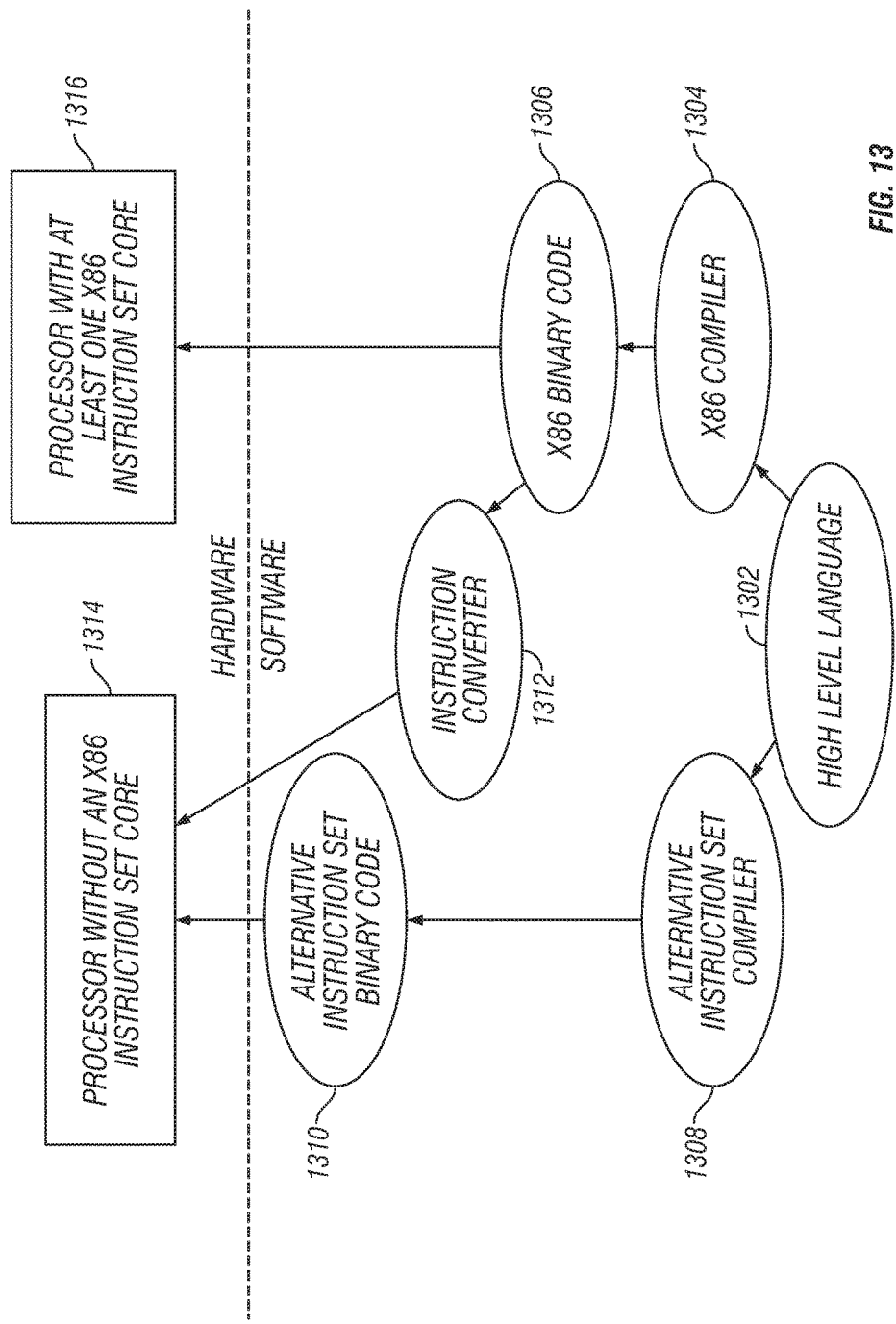
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
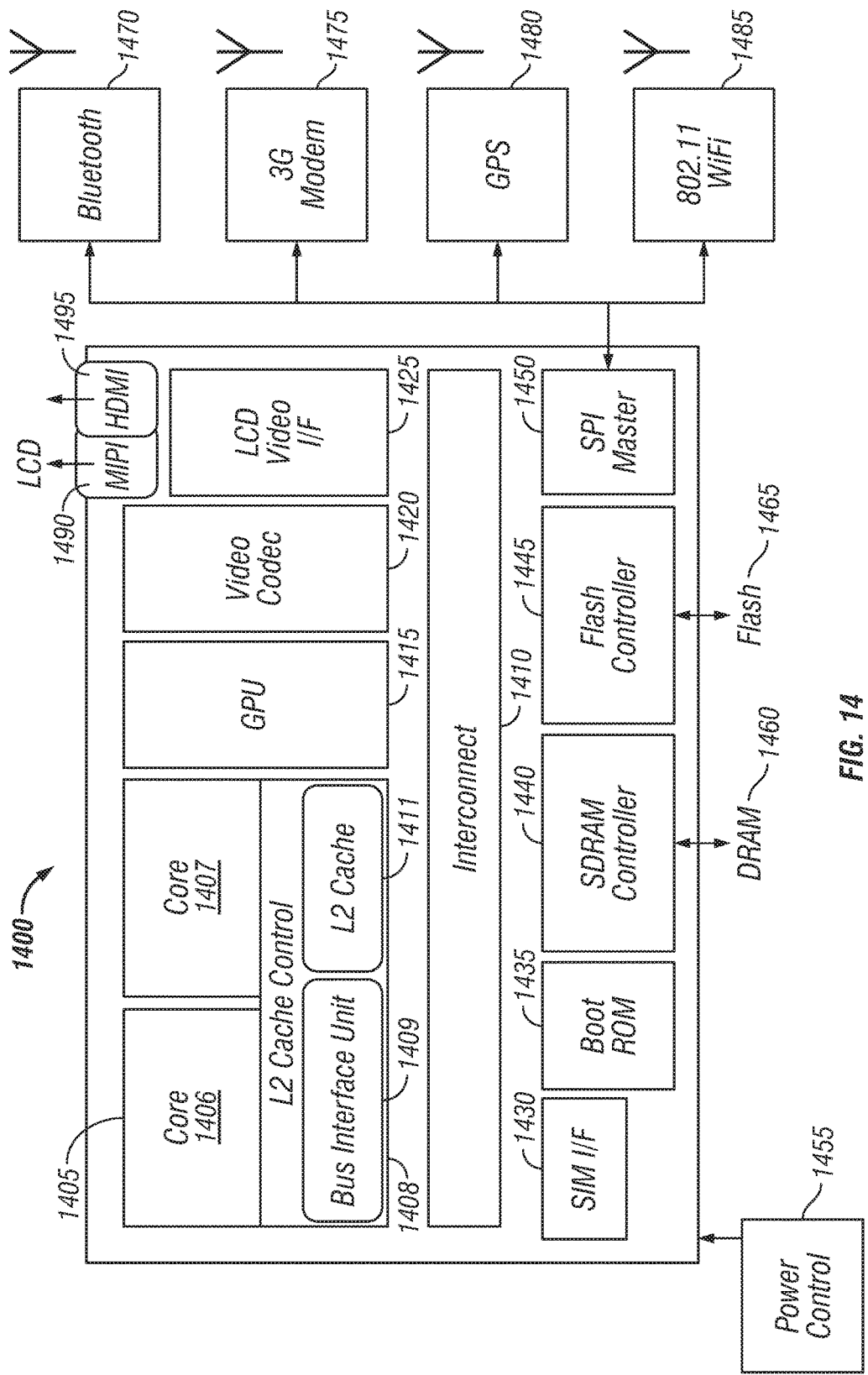
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module 1460. Flash controller 1445 may provide access to or from memory such as flash memory 1465 or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
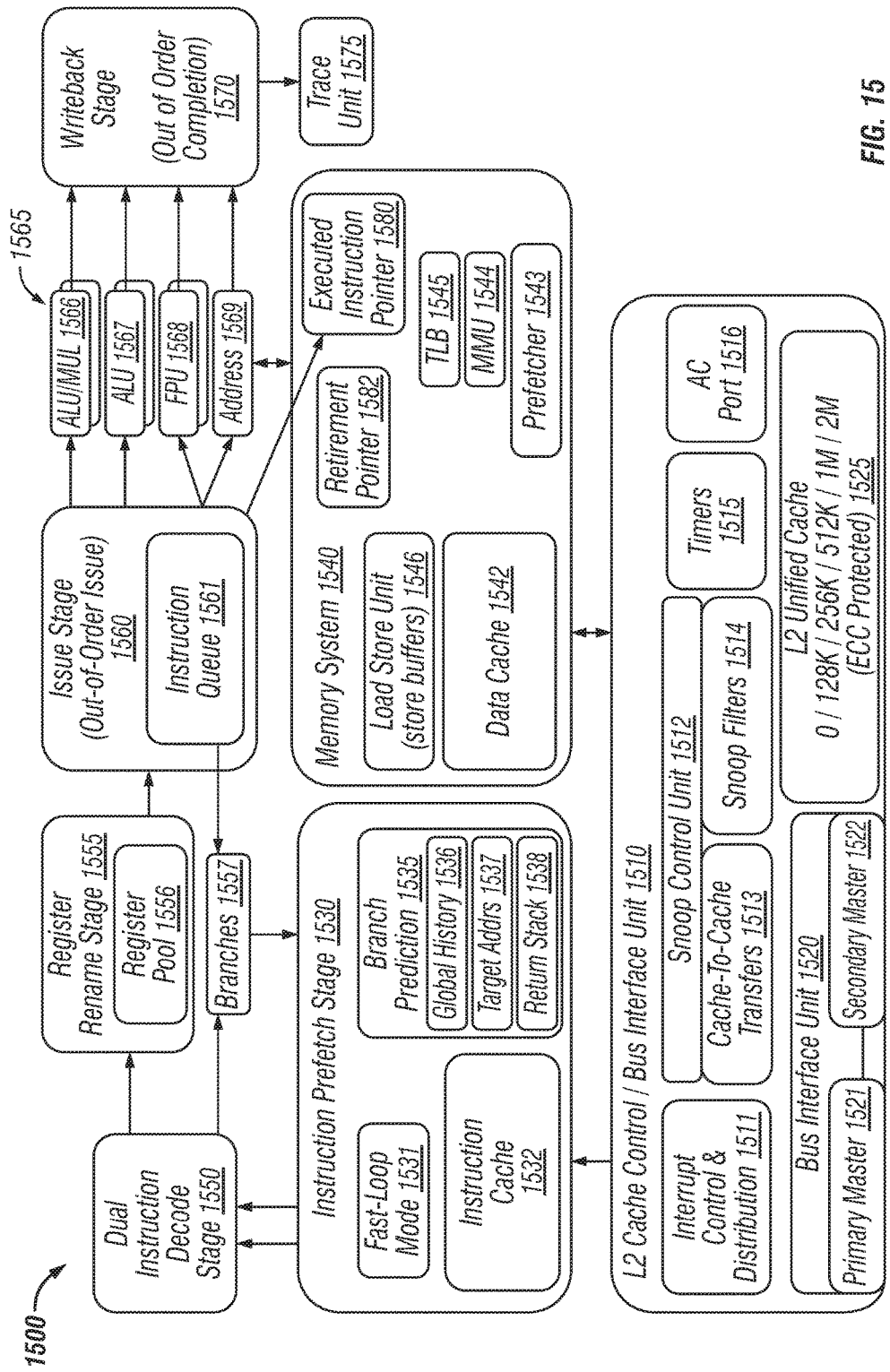
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1565 may be performed by one or more stages of execution. Such stages may include, for example, instruction prefetch stage 1530, dual instruction decode stage 1550, register rename stage 1555, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to the PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers. In another embodiment, memory system 1540 may include a translation lookaside buffer (TLB) 1545 that provides look-up of address values between physical and virtual addresses. In yet another embodiment, memory system 1540 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage 1550.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
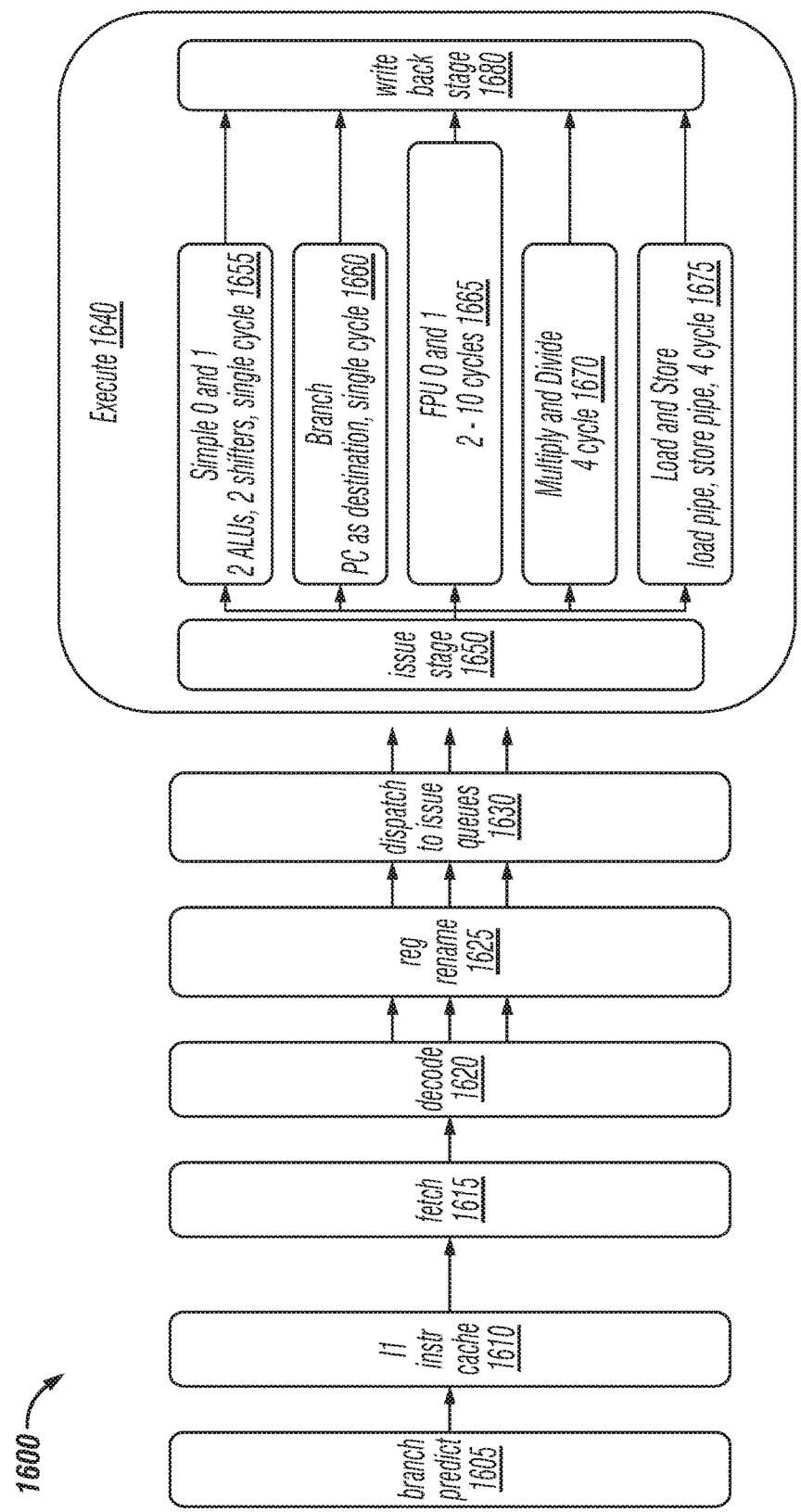
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
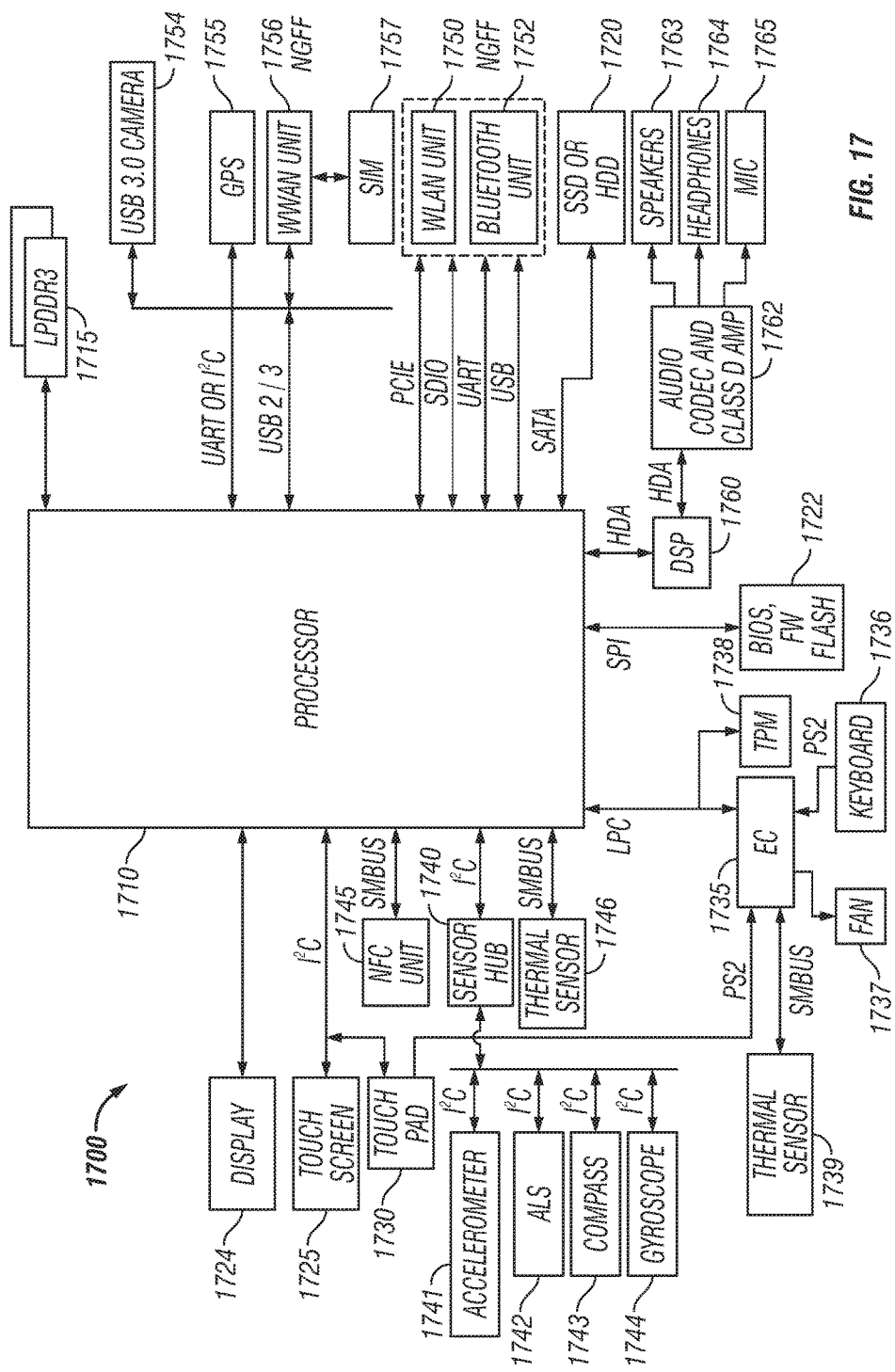
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I$^2$C bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1775, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1736, and touch pad 1730 may be communicatively coupled to EC 1735. Speakers 1763, headphones 1764, and a microphone 1765 may be communicatively coupled to an audio unit 1762, which may in turn be communicatively coupled to DSP 1760. Audio unit 1762 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
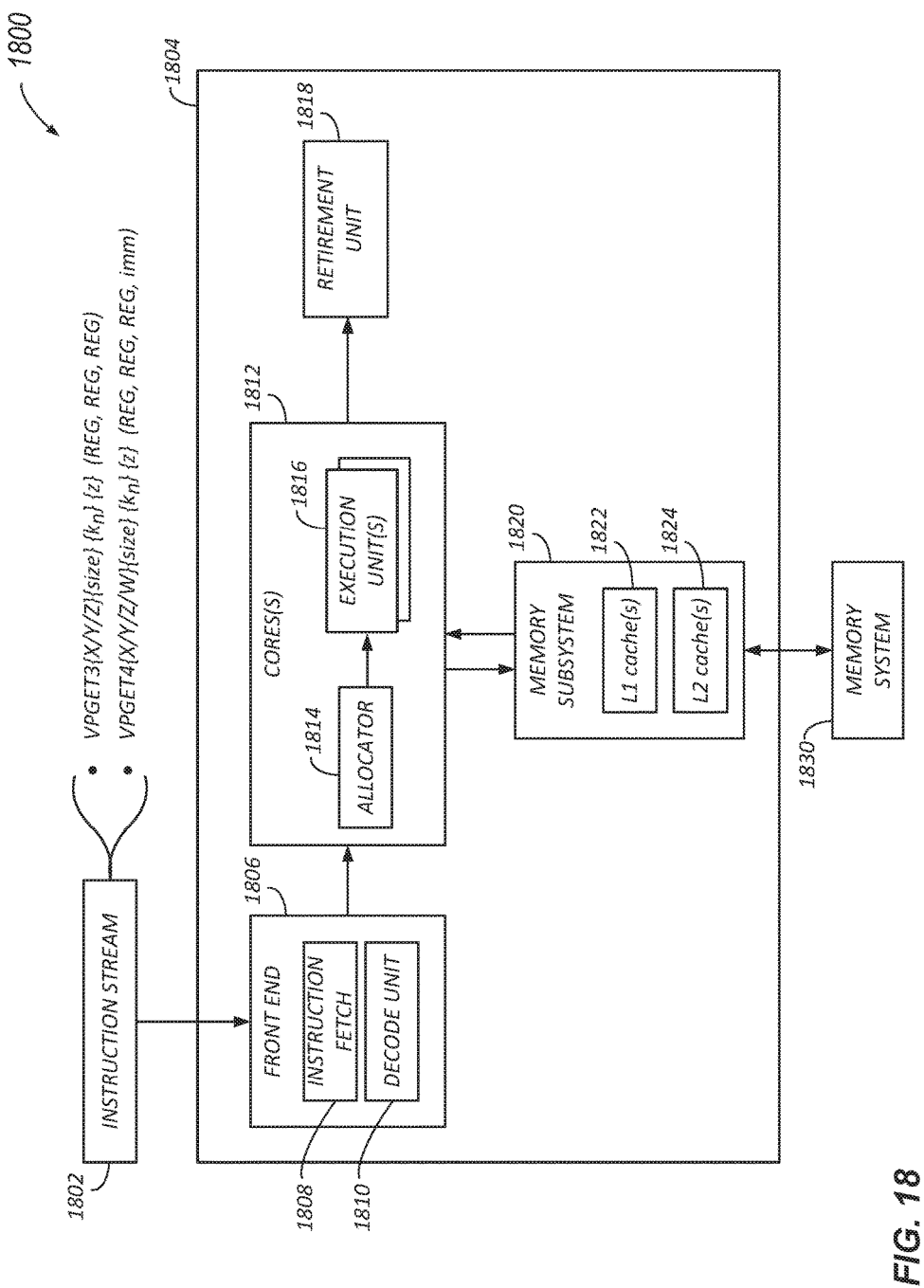
FIG. 18 is an illustration of an example system for instructions and logic for vector operations to get multiple vector elements of the same type, in accordance with embodiments of the present disclosure.

Embodiments of the present disclosure involve instructions and processing logic for executing one or more vector operations that target vector registers, at least some of which operate on structures stored in the vector registers that contain multiple elements. FIG. 18 is an illustration of an example system 1800 for instructions and logic for operations to get multiple vector elements of the same type, according to embodiments of the present disclosure.

Data structures used in some applications may include tuples of elements that can be accessed individually. In some cases, these types of data structures may be organized as arrays. In embodiments of the present disclosure, multiple ones of these data structures may be stored in a single vector register. For example, each data structure may include multiple data elements of different types, and each of the data structures may be stored in a different "lane" within a vector register. In this context, the term "lane" may refer to a fixed-width portion of a vector register that holds multiple data elements. For example, a 512-bit vector register may include four 128-bit lanes. In embodiments of the present disclosure, the individual data elements within such data structures may be re-organized into multiple separate vectors of like elements in order to operate on like elements in the same manner. For example, one or more "GET multiple vector elements" instructions may be executed to extract like elements from the data structures and to store them together in respective destination vectors. After operating on at least some of the data elements, one or more other instructions may be called to permute the data elements in the separate vectors back into their original data structures of tuples.

System 1800 may include a processor, SoC, integrated circuit, or other mechanism. For example, system 1800 may include processor 1804. Although processor 1804 is shown and described as an example in FIG. 18, any suitable mechanism may be used. Processor 1804 may include any suitable mechanisms for executing vector operations that target vector registers, including those that operate on structures stored in the vector registers that contain multiple elements. In one embodiment, such mechanisms may be implemented in hardware. Processor 1804 may be implemented fully or in part by the elements described in FIGS. 1-17.

Instructions to be executed on processor 1804 may be included in instruction stream 1802. Instruction stream 1802 may be generated by, for example, a compiler, just-in-time interpreter, or other suitable mechanism (which might or might not be included in system 1800), or may be designated by a drafter of code resulting in instruction stream 1802. For example, a compiler may take application code and generate executable code in the form of instruction stream 1802. Instructions may be received by processor 1804 from instruction stream 1802. Instruction stream 1802 may be loaded to processor 1804 in any suitable manner. For example, instructions to be executed by processor 1804 may be loaded from storage, from other machines, or from other memory, such as memory system 1830. The instructions may arrive and be available in resident memory, such as RAM, wherein instructions are fetched from storage to be executed by processor 1804. The instructions may be fetched from resident memory by, for example, a prefetcher or fetch unit (such as instruction fetch unit 1808).

In one embodiment, instruction stream 1802 may include an instruction to perform an operation to get multiple vector elements of the same type from data structures stored in one or more vector registers. For example, in one embodiment, instruction stream 1802 may include one or more "VPGET3" type instructions to get multiple vector elements of the same type from three-element data structures stored in multiple source vector registers and store them together in a single destination vector register. In another embodiment, instruction stream 1802 may include one or more "VPGET4" type instructions to get multiple vector elements of the same type from four-element data structures stored in multiple source vector registers and store them together in a single destination vector register. Note that instruction stream 1802 may include instructions other than those that perform vector operations.

Processor 1804 may include a front end 1806, which may include an instruction fetch pipeline stage (such as instruction fetch unit 1808) and a decode pipeline stage (such as decide unit 1810). Front end 1806 may receive and decode instructions from instruction stream 1802 using decode unit 1810. The decoded instructions may be dispatched, allocated, and scheduled for execution by an allocation stage of a pipeline (such as allocator 1814) and allocated to specific execution units 1816 for execution. One or more specific instructions to be executed by processor 1804 may be included in a library defined for execution by processor 1804. In another embodiment, specific instructions may be targeted by particular portions of processor 1804. For example, processor 1804 may recognize an attempt in instruction stream 1802 to execute a vector operation in software and may issue the instruction to a particular one of execution units 1816.

During execution, access to data or additional instructions (including data or instructions resident in memory system 1830) may be made through memory subsystem 1820. Moreover, results from execution may be stored in memory subsystem 1820 and may subsequently be flushed to memory system 1830. Memory subsystem 1820 may include, for example, memory, RAM, or a cache hierarchy, which may include one or more Level 1 (L1) caches 1822 or Level 2 (L2) caches 1824, some of which may be shared by multiple cores 1812 or processors 1804. After execution by execution units 1816, instructions may be retired by a writeback stage or retirement stage in retirement unit 1818. Various portions of such execution pipelining may be performed by one or more cores 1812.

An execution unit 1816 that executes vector instructions may be implemented in any suitable manner. In one embodiment, an execution unit 1816 may include or may be communicatively coupled to memory elements to store information necessary to perform one or more vector operations. In one embodiment, an execution unit 1816 may include circuitry to perform operations to get multiple vector elements of the same type from data structures stored in vector registers. For example, an execution unit 1816 may include circuitry to implement one or more forms of a "VPGET3" type instruction. In another example, an execution unit 1816 may include circuitry to implement one or more forms of a "VPGET4" type instruction. Example implementations of these instructions are described in more detail below.

In embodiments of the present disclosure, the instruction set architecture of processor 1804 may implement one or more extended vector instructions that are defined as Intel® Advanced Vector Extensions 512 (Intel® AVX-512) instructions. Processor 1804 may recognize, either implicitly or through decoding and execution of specific instructions, that one of these extended vector operations is to be performed. In such cases, the extended vector operation may be directed to a particular one of the execution units 1816 for execution of the instruction. In one embodiment, the instruction set architecture may include support for 512-bit SIMD operations. For example, the instruction set architecture implemented by an execution unit 1816 may include 32 vector registers, each of which is 512 bits wide, and support for vectors that are up to 512 bits wide. The instruction set architecture implemented by an execution unit 1816 may include eight dedicated mask registers for conditional execution and efficient merging of destination operands. At least some extended vector instructions may include support for broadcasting. At least some extended vector instructions may include support for embedded masking to enable predication.

At least some extended vector instructions may apply the same operation to each element of a vector stored in a vector register at the same time. Other extended vector instructions may apply the same operation to corresponding elements in multiple source vector registers. For example, the same operation may be applied to each of the individual data elements of a packed data item stored in a vector register by an extended vector instruction. In another example, an extended vector instruction may specify a single vector operation to be performed on the respective data elements of two source vector operands to generate a destination vector operand.

In embodiments of the present disclosure, at least some extended vector instructions may be executed by a SIMD coprocessor within a processor core. For example, one or more of execution units 1816 within a core 1812 may implement the functionality of a SIMD coprocessor. The SIMD coprocessor may be implemented fully or in part by the elements described in FIGS. 1-17. In one embodiment, extended vector instructions that are received by processor 1804 within instruction stream 1802 may be directed to an execution unit 1816 that implements the functionality of a SIMD coprocessor.

As illustrated in FIG. 18, in one embodiment, a VPGET3 type instruction may include an {X/Y/Z} parameter indicating which data elements in each data structure are to be extracted. A VPGET3 type instruction may also include a {size} parameter indicating the size of the data elements in each data structure. In one embodiment, all of the data elements may be the same size and type. In one embodiment, a VPGET3 type instruction may include three REG parameters that identify three source vector registers for the instruction, one of which is also the destination vector register for the instruction. In one embodiment, a VPGET3 type instruction may include a $\{k_n\}$ parameter that identifies a particular mask register, if masking is to be applied. If masking is to be applied, the VPGET3 type instruction may include a {z} parameter that specifies a masking type. In one embodiment, a VPGET4 type instruction may include an {X/Y/Z/W} parameter indicating which data elements in each data structure are to be extracted. A VPGET4 type instruction may also include a {size} parameter indicating the size of the data elements in each data structure. In one embodiment, all of the data elements may be the same size and type. In one embodiment, a VPGET4 type instruction may include three REG parameters, two of which identify two source vector registers for the instruction, and one of which identifies a destination vector register for the instruction. In one embodiment, a VPGET4 type instruction may include an immediate parameter whose value represents a destination offset for the instruction. In one embodiment, a VPGET4 type instruction may include a $\{k_n\}$ parameter that identifies a particular mask register, if masking is to be applied. If masking is to be applied, the VPGET4 type instruction may include a {z} parameter that specifies a masking type.

One or more of the parameters of the VPGET3 and VPGET4 type instructions shown in FIG. 18 may be inherent for the instruction. For example, in different embodiments, any combination of these parameters may be encoded in a bit or field of the opcode format for the instruction. In other embodiments, one or more of the parameters of the VPGET3 and VPGET4 type instructions shown in FIG. 18 may be optional for the instruction. For example, in different embodiments, any combination of these parameters may be specified when the instruction is called.

Figure 19:
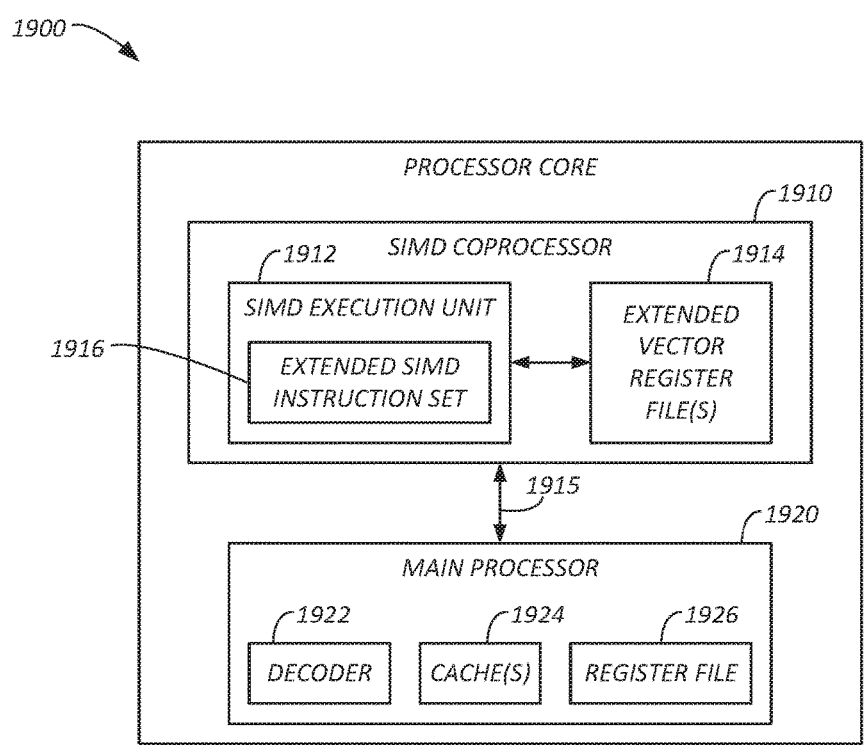
FIG. 19 is a block diagram illustrating a processor core to execute extended vector instructions, in accordance with embodiments of the present disclosure.

FIG. 19 illustrates an example processor core 1900 of a data processing system that performs SIMD operations, in accordance with embodiments of the present disclosure. Processor 1900 may be implemented fully or in part by the elements described in FIGS. 1-18. In one embodiment, processor core 1900 may include a main processor 1920 and a SIMD coprocessor 1910. SIMD coprocessor 1910 may be implemented fully or in part by the elements described in FIGS. 1-17. In one embodiment, SIMD coprocessor 1910 may implement at least a portion of one of the execution units 1816 illustrated in FIG. 18. In one embodiment, SIMD coprocessor 1910 may include a SIMD execution unit 1912 and an extended vector register file 1914. SIMD coprocessor 1910 may perform operations of extended SIMD instruction set 1916. Extended SIMD instruction set 1916 may include one or more extended vector instructions. These extended vector instructions may control data processing operations that include interactions with data resident in extended vector register file 1914.

In one embodiment, main processor 1920 may include a decoder 1922 to recognize instructions of extended SIMD instruction set 1916 for execution by SIMD coprocessor 1910. In other embodiments, SIMD coprocessor 1910 may include at least part of decoder (not shown) to decode instructions of extended SIMD instruction set 1916. Processor core 1900 may also include additional circuitry (not shown) which may be unnecessary to the understanding of embodiments of the present disclosure.

In embodiments of the present disclosure, main processor 1920 may execute a stream of data processing instructions that control data processing operations of a general type, including interactions with cache(s) 1924 and/or register file 1926. Embedded within the stream of data processing instructions may be SIMD coprocessor instructions of extended SIMD instruction set 1916. Decoder 1922 of main processor 1920 may recognize these SIMD coprocessor instructions as being of a type that should be executed by an attached SIMD coprocessor 1910. Accordingly, main processor 1920 may issue these SIMD coprocessor instructions (or control signals representing SIMD coprocessor instructions) on the coprocessor bus 1915. From coprocessor bus 1915, these instructions may be received by any attached SIMD coprocessor. In the example embodiment illustrated in FIG. 19, SIMD coprocessor 1910 may accept and execute any received SIMD coprocessor instructions intended for execution on SIMD coprocessor 1910.

In one embodiment, main processor 1920 and SIMD coprocessor 1920 may be integrated into a single processor core 1900 that includes an execution unit, a set of register files, and a decoder to recognize instructions of extended SIMD instruction set 1916.

The example implementations depicted in FIGS. 18 and 19 are merely illustrative and are not meant to be limiting on the implementation of the mechanisms described herein for performing extended vector operations.

FIG. 20 is a block diagram illustrating an example extended vector register file 1914, in accordance with embodiments of the present disclosure. Extended vector register file 1914 may include 32 SIMD registers (ZMM0-ZMM31), each of which is 512-bit wide. The lower 256 bits of each of the ZMM registers are aliased to a respective 256-bit YMM register. The lower 128 bits of each of the YMM registers are aliased to a respective 128-bit XMM register. For example, bits 255 to 0 of register ZMM0 (shown as 2001) are aliased to register YMM0, and bits 127 to 0 of register ZMM0 are aliased to register XMM0. Similarly, bits 255 to 0 of register ZMM1 (shown as 2002) are aliased to register YMM1, bits 127 to 0 of register ZMM1 are aliased to register XMM1, bits 255 to 0 of register ZMM2 (shown as 2003) are aliased to register YMM2, bits 127 to 0 of the register ZMM2 are aliased to register XMM2, and so on.

In one embodiment, extended vector instructions in extended SIMD instruction set 1916 may operate on any of the registers in extended vector register file 1914, including registers ZMM0-ZMM31, registers YMM0-YMM15, and registers XMM0-XMM7. In another embodiment, legacy SIMD instructions implemented prior to the development of the Intel® AVX-512 instruction set architecture may operate on a subset of the YMM or XMM registers in extended vector register file 1914. For example, access by some legacy SIMD instructions may be limited to registers YMM0-YMM5 or to registers XMM0-XMM7, in some embodiments.

In embodiments of the present disclosure, the instruction set architecture may support extended vector instructions that access up to four instruction operands. For example, in at least some embodiments, the extended vector instructions may access any of 32 extended vector registers ZMM0-ZMM31 shown in FIG. 20 as source or destination operands. In some embodiments, the extended vector instructions may access any one of eight dedicated mask registers. In some embodiments, the extended vector instructions may access any of sixteen general-purpose registers as source or destination operands.

In embodiments of the present disclosure, encodings of the extended vector instructions may include an opcode specifying a particular vector operation to be performed. Encodings of the extended vector instructions may include an encoding identifying any of eight dedicated mask registers, k0-k7. Each bit of the identified mask register may govern the behavior of a vector operation as it is applied to a respective source vector element or destination vector element. For example, in one embodiment, seven of these mask registers (k1-k7) may be used to conditionally govern the per-data-element computational operation of an extended vector instruction. In this example, the operation is not performed for a given vector element if the corresponding mask bit is not set. In another embodiment, mask registers k1-k7 may be used to conditionally govern the per-element updates to the destination operand of an extended vector instruction. In this example, a given destination element is not updated with the result of the operation if the corresponding mask bit is not set.

In one embodiment, encodings of the extended vector instructions may include an encoding specifying the type of masking to be applied to the destination (result) vector of an extended vector instruction. For example, this encoding may specify whether merging-masking or zero-masking is applied to the execution of a vector operation. If this encoding specifies merging-masking, the value of any destination vector element whose corresponding bit in the mask register is not set may be preserved in the destination vector. If this encoding specifies zero-masking, the value of any destination vector element whose corresponding bit in the mask register is not set may be replaced with a value of zero in the destination vector. In one example embodiment, mask register k0 is not used as a predicate operand for a vector operation. In this example, the encoding value that would otherwise select mask k0 may instead select an implicit mask value of all ones, thereby effectively disabling masking. In this example, mask register k0 may be used for any instruction that takes one or more mask registers as a source or destination operand.

One example of the use and syntax of an extended vector instruction is shown below:

VADDPS zmm1, zmm2, zmm3

In one embodiment, the instruction shown above would apply a vector addition operation to all of the elements of the source vector registers zmm2 and zmm3. In one embodiment, the instruction shown above would store the result vector in destination vector register zmm1. Alternatively, an instruction to conditionally apply a vector operation is shown below:

VADDPS zmm1 {k1 }{z}, zmm2, zmm3

In this example, the instruction would apply a vector addition operation to the elements of the source vector registers zmm2 and zmm3 for which the corresponding bit in mask register k1 is set. In this example, if the {z} modifier is set, the values of the elements of the result vector stored in destination vector register zmm1 corresponding to bits in mask register k1 that are not set may be replaced with a value of zero. Otherwise, if the {z} modifier is not set, or if no {z} modifier is specified, the values of the elements of the result vector stored in destination vector register zmm1 corresponding to bits in mask register k1 that are not set may be preserved.

In one embodiment, encodings of some extended vector instructions may include an encoding to specify the use of embedded broadcast. If an encoding specifying the use of embedded broadcast is included for an instruction that loads data from memory and performs some computational or data movement operation, a single source element from memory may be broadcast across all elements of the effective source operand. For example, embedded broadcast may be specified for a vector instruction when the same scalar operand is to be used in a computation that is applied to all of the elements of a source vector. In one embodiment, encodings of the extended vector instructions may include an encoding specifying the size of the data elements that are packed into a source vector register or that are to be packed into a destination vector register. For example, the encoding may specify that each data element is a byte, word, doubleword, or quadword, etc. In another embodiment, encodings of the extended vector instructions may include an encoding specifying the data type of the data elements that are packed into a source vector register or that are to be packed into a destination vector register. For example, the encoding may specify that the data represents single or double precision integers, or any of multiple supported floating point data types.

In one embodiment, encodings of the extended vector instructions may include an encoding specifying a memory address or memory addressing mode with which to access a source or destination operand. In another embodiment, encodings of the extended vector instructions may include an encoding specifying a scalar integer or a scalar floating point number that is an operand of the instruction. While several specific extended vector instructions and their encodings are described herein, these are merely examples of the extended vector instructions that may be implemented in embodiments of the present disclosure. In other embodiments, more fewer, or different extended vector instructions may be implemented in the instruction set architecture and their encodings may include more, less, or different information to control their execution.

Data structures that are organized in tuples of three or four elements that can be accessed individually are common in many applications. For examples, RGB (Red-Green-Blue) is a common format in many encoding schemes used in media applications. A data structure storing this type of information may consist of three data elements (an R component, a G component, and a B component), which are stored contiguously and are the same size (for example, they may all be 32-bit integers). A format that is common for encoding data in High Performance Computing applications includes two or more coordinate values that collectively represent a position within a multidimensional space. For example, a data structure may store X and Y coordinates representing a position within a 2D space or may store X, Y, and Z coordinates representing a position within a 3D space. Other common data structures having a higher number of elements may appear in these and other types of applications.

In some cases, these types of data structures may be organized as arrays. In embodiments of the present disclosure, multiple ones of these data structures may be stored in a single vector register, such as one of the XMM, YMM, or ZMM vector registers described above. In one embodiment, the individual data elements within such data structures may be re-organized into vectors of like elements that can then be used in SIMD loops, as these elements might not be stored next to each other in the data structures themselves. An application may include instructions to operate on all of the data elements of one type in the same way and instructions to operate on all of the data elements of a different type in a different way. In one example, for an array of data structures that each include an R component, a G components, and a B component in an RGB color space, a different computational operation may be applied to the R components in each of the rows of the array (each data structures) than a computational operation that is applied to the G components or the B components in each of the rows of the array. In embodiments of the present disclosure, in order to operate on individual ones of these types of components, one or more vector GET3 instructions may be used to extract the R values, G values, and B values from the array of RGB data structures into separate vectors that contain elements of the same type. As a result, one of the vectors may include all of the R values, one may include all of the G values, and one may include all of the B values.

In another example, many molecular dynamics applications operate on neighbor lists consisting of an array of XYZW data structures. In this example, each of the data structures may include an X component, a Y component, a Z component, and a W component. In embodiments of the present disclosure, in order to operate on individual ones of these types of components, one or more vector GET4 instructions may be used to extract the X values, Y values, Z values, and W values from the array of XYZW data structures into separate vectors that contain elements of the same type. As a result, one of the vectors may include all of the X values, one may include all of the Y values, one may include all of the Z values, and one may include all of the W values. In some cases, after operating on at least some of the data elements within these separate vectors, an application may include instructions that operate on the XYZW data structures as a whole. For example, after updating at least some of the X, Y, Z, or W values in the separate vectors, the application may include instructions that access one of the data structures to retrieve or operate on an XYZW data structure as a whole. In this case, one or more other instructions may be called in order to store the XYZW values back in their original format.

In embodiments of the present disclosure, the instructions for performing extended vector operations that are implemented by a processor core (such as core 1812 in system 1800) or by a SIMD coprocessor (such as SIMD coprocessor 1910) may include an instruction to perform a vector operation to get data elements of the same type from data structures that include three data elements of different types or a vector operation to get data elements of the same type from data structures that include four data elements of different types. For example, these instructions may include one or more "VPGET3" or "VPGET4" instructions. In embodiments of the present disclosure, these VPGET3 and VPGET4 instructions may be used to extract data elements of different types from data structures that include elements of multiple types. The VPGET3 and VPGET4 instructions may store the extracted data elements into respective vectors containing the different data elements of a data structure in memory. In one embodiment, these instructions may be used to extract data elements from data structures whose data elements are stored together in contiguous locations within one or more source vector registers. In one embodiment, each of the multiple-element data structures may represent a row of an array.

In embodiments of the present disclosure, different "lanes" within a vector register may be used to hold data elements of different types. In one embodiment, each lane may hold multiple data elements of a single type. In another embodiment, the data elements held in a single lane may not be of the same type, but they may be operated on by an application in the same way. For example, one lane may hold X values, one lane may hold Y values, and so on. In this context, the term "lane" may refer to a portion of the vector register that holds multiple data elements that are to be treated in the same way, rather than to a portion of the vector register that holds a single data element. In another embodiment, different "lanes" within a vector register may be used to hold the data elements of different data structures. In this context, the term "lane" may refer to a portion of the vector register that holds multiple data elements of a single data structure. In this example, the data elements stored in each lane may be of two or more different types. In one embodiment in which the vector registers are 512 bits wide, there may be four 128-bit lanes. For example, the lowest-order 128 bits within a 512-bit vector register may be referred as the first lane, the next 128 bits may be referred to as the second lane, and so on. In this example, each of the 128-bit lanes may store two 64-bit data elements, four 32-bit data elements, eight 16-bit data elements, or four 8-bit data elements. In another embodiment in which the vector registers are 512 bits wide, there may be two 256-bit lanes, each of which stores data elements of a respective data structure. In this example, each of the 256-bit lanes may store multiple data elements of up to 128 bits each.

In one embodiment, data representing multiple XYZ-type data structures may be stored in extended vector registers, such as ZMM registers. In this example, the X, Y, and Z components of each data structure may be 32-bits each. Each of the ZMM registers may store data elements representing a first data structure in a first lane, data elements representing a second data structure in a second lane, data elements representing a third data structure in a third lane, and data elements representing a fourth data structure in a fourth lane. In one embodiment, XYZ-type data structures may be stored collectively in three different vector registers. For example, each ZMM register may store sixteen 32-bit data elements from among the 48 data elements that make up the three data structures. In one embodiment, a "VPGET3" instruction may be used to extract the X components from the three XYZ-type data structures stored collectively in the three source ZMM register and to store them to a destination vector register. In one embodiment, one of the source vector registers may also serve as the destination vector register. In this case, the source data in the dual-purpose vector register representing multiple XYZ-type data structures may be overwritten with extracted data elements of a single type (the X components for all of the data structures in the three source vector registers). In another embodiment, the destination vector register may be another extended vector register such as a ZMM register. In this example, the VPGET3 instruction may permute the data elements extracted from the source ZMM registers to create a destination vector. For example, the destination vector that is generated by the VPGET3 instruction and stored to a destination ZMM register by the VPGET3 instruction may include the X data elements from the data structures stored in the three source ZMM registers in the following order: X1, X2, X3. . . X16 In this example, two additional VPGET3 instructions may be used to the Y and Z components from the data structures in the three source ZMM registers, respectively, and to store them to separate destination vector registers.

In one embodiment, data representing sixteen XYZW-type data structures may be stored in four extended vector registers, such as ZMM registers. In this example, the X, Y, Z and W components of each data structure may be 32-bits each. Each of the ZMM registers may store data elements representing a first data structure in a first lane, data elements representing a second data structure in a second lane, data elements representing a third data structure in a third lane, and data elements representing a fourth data structure in a fourth lane. In one embodiment, a "VPGET4" instruction may be used to extract the X components from the four XYZW-type data structures in each of the first two source ZMM registers and to store them to the lowest-order half of a destination vector register. In one embodiment, one of the source vector registers may also serve as the destination vector register. In this case, the source data in the dual-purpose vector register representing multiple XYZW-type data structures may be overwritten with extracted data elements of a single type (the X components for all of the data structures in the three source vector registers). In another embodiment, the destination vector register may be another extended vector register such as a ZMM register. In this example, the VPGET4 instruction may permute the data elements extracted from the two source ZMM registers to create a destination vector. For example, the destination vector that is generated by the VPGET4 instruction and stored to a destination ZMM register by the VPGET4 instruction may include the X data elements from the four lanes of the first two source ZMM registers in the following order: X1, X2, X3. . . X8. In this example, a second VPGET4 instruction may be used to extract the X components from the four XYZW-type data structures in each of the third and fourth source ZMM registers and to store them to the highest-order half of the same destination vector register, or to a different destination register (with or without an offset from the lowest-order position). Similarly, VPGET4 instructions may be used to extract the Y, Z, or W components from the four XYZW-type data structures in two of the source ZMM registers at a time and to store them in one half of a destination vector register.

Figure 21:
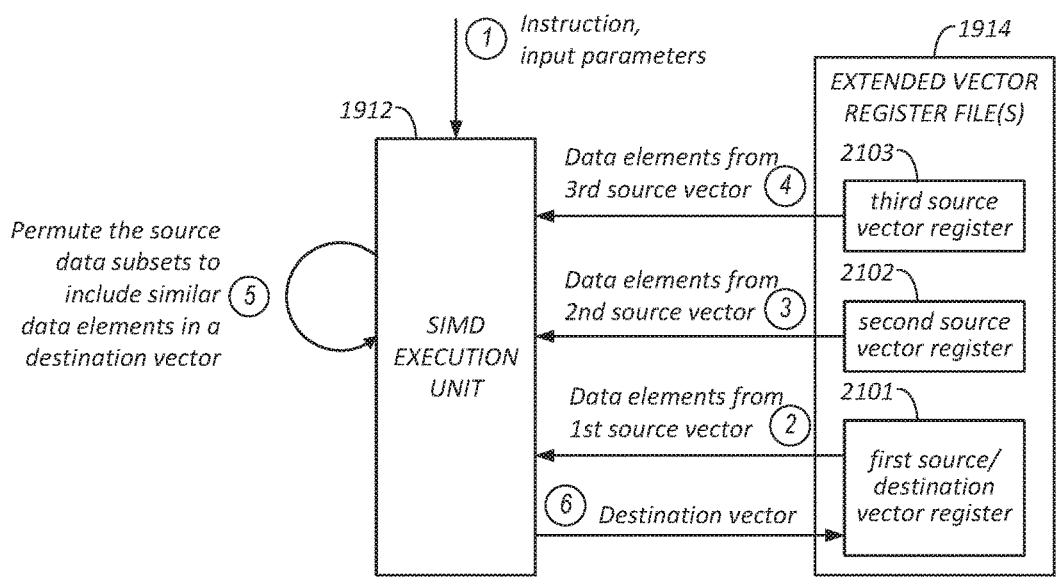
FIG. 21 is an illustration of an operation to perform a vector GET operation to get multiple elements of the same type, according to embodiments of the present disclosure.

FIG. 21 is an illustration of an operation to perform a vector operation to get multiple elements of the same type, according to embodiments of the present disclosure. In one embodiment, system 1800 may execute an instruction to perform a vector GET operation. For example, a VPGET3 instruction or a VPGET4 instruction may be executed. The instruction may include any suitable number and kind of operands, bits, flags, parameters, or other elements. In one embodiment, the encodings for the VPGET3 and VPGET4 instructions may include some or all of the same fields, and these common fields may be populated in the same ways for similar variants of these instructions. In one embodiment, the value of a single bit or field in the encodings of the VPGET3 and VPGET4 instructions may indicate whether the data structures from which data elements are to be extracted by the instruction contain three or four data elements. In another embodiment, the VPGET3 and VPGET4 instructions may share an opcode, and an instruction parameter included in the call of the instruction may indicate whether the data structures from which data elements are to be extracted by the instruction contain three or four data elements.

In one embodiment, a call of a VPGET3 instruction or a VPGET4 instruction may reference three source vector registers. Each of the source vector registers may be an extended vector register that contains packed data representing multiple data elements of two or more data structures. The data elements of each of the data structures may be stored in contiguous locations in the source vector registers. A call of a VPGET3 instruction or a VPGET4 instruction may also reference a destination vector register. The destination vector register may be an extended vector register into which data elements of the same type may be stored after being extracted from the data structures stored within the source vector registers by the instruction. In the example illustrated in FIG. 21, the first referenced source vector register also serves as the destination vector register for the instruction. In one example, execution of the VPGET3 instruction may cause data elements in the same position within each three-element data structure in the source vector registers to be written to contiguous locations in the destination vector register referenced in the call of the VPGET3 instruction. Similarly, execution of the VPGET4 instruction may cause data elements in the same position within each four-element data structure in the source vector registers to be written to contiguous locations in the destination vector register referenced in the call of the VPGET4 instruction.

In one embodiment, a call of a VPGET3 or VPGET4 instruction may specify the size of the data elements in the data structures represented by the data stored in the source vector registers. In another embodiment, a call of a VPGET3 or VPGET4 instruction may specify the position of the data elements within the data structures stored in the source vector registers that are to be extracted. For example, a call of VPGET3 instruction may include an encoding or a parameter specifying whether the first (X), second (Y), or third (Z) elements should be extracted from each data structure in the source vector registers. Similarly, a call of VPGET4 instruction may include an encoding or a parameter specifying whether the first (X), second (Y), third (Z), or fourth (W) elements should be extracted from each data structure in the source vector registers. In one embodiment, a call of a VPGET4 instruction may include a destination offset parameter indicating the position within the destination vector (and destination vector register) at which the data elements extracted by the VPGET4 instruction should begin to be stored. In one embodiment, a call of a VPGET3 or VPGET4 instruction may specify a mask register to be applied to the result of the execution when writing it to the destination vector register. In yet another embodiment, a call of a VPGET3 or VPGET4 instruction may specify the type of masking to be applied to the result, such as merging-masking or zero-masking. In still other embodiments, more, fewer, or different parameters may be referenced in a call of a VPGET3 or VPGET4 instruction.

In the example embodiment illustrated in FIG. 21, at (1) the VPGET3 or VPGET4 instruction and its parameters (which may include any or all of the source and destination vector registers described above, an indication of the size of the data elements in each data structure, an indication of which data elements in each data structure are to be extracted, a parameter specifying a destination offset for VPGET4 instruction, a parameter identifying a particular mask register, or a parameter specifying a masking type) may be received by SIMD execution unit 1912. For example, the VPGET3 or VPGET4 instruction may be issued to SIMD execution unit 1912 within a SIMD coprocessor 1910 by an allocator 1814 within a core 1812, in one embodiment. In another embodiment, the VPGET3 or VPGET4 instruction may be issued to SIMD execution unit 1912 within a SIMD coprocessor 1910 by a decoder 1922 of a main processor 1920. The VPGET3 or VPGET4 instruction may be executed logically by SIMD execution unit 1912.

In this example, packed data representing multiple data structures may be stored in a first source vector register 2101, a second source vector register 2102, and a third source vector register 2103 within an extended vector register file 1914. The data may be stored in each of these extended vector registers ZMMn such that the data elements that make up each of the data structures are stored together in the extended vector register. For example, a first lane that includes the lowest-order bits of the extended vector register 2101 may store multiple data elements of a first data structure, a second lane that includes the next-lowest-order bits of the extended vector register 2101 may store multiple data elements of a second data structure, and so on. In this example, the first source vector register 2101 also serves as the destination vector register for the instruction.

Execution of the VPGET3 or VPGET4 instruction by SIMD execution unit 1912 may include, at (2) obtaining data elements representing a single component of each of the data structures stored in the first source vector register 2101 in extended vector register file 1914. For example, a parameter of the VPGET3 or VPGET4 instruction may identify an extended vector register 2101 as the first source of the data to be stored to a destination vector register by the VPGET3 or VPGET4 instruction, and SIMD execution unit 1912 may extract the specified data elements from the packed data that was stored in multiple lanes in the identified first source vector register. Execution of the VPGET3 or VPGET4 instruction by SIMD execution unit 1912 may include, at (3) obtaining data elements representing the same single component of each of the data structures stored in the second source vector register 2102 in extended vector register file 1914. For example, a parameter of the VPGET3 or VPGET4 instruction may identify an extended vector register 2102 as the second source of the data to be stored to a destination vector register by the VPGET3 or VPGET4 instruction, and SIMD execution unit 1912 may extract the specified data elements from the packed data that was stored in multiple lanes in the identified second source vector register. Execution of the VPGET3 or VPGET4 instruction by SIMD execution unit 1912 may include, at (4) obtaining data elements representing the same single component of each of the data structures stored in the third source vector register 2103 in extended vector register file 1914. For example, a parameter of the VPGET3 or VPGET4 instruction may identify an extended vector register 2103 as the third source of the data to be stored to a destination vector register by the VPGET3 or VPGET4 instruction, and SIMD execution unit 1912 may extract the specified data elements from the packed data that was stored in multiple lanes in the identified third source vector register Execution of the VPGET3 or VPGET4 instruction by SIMD execution unit 1912 may include, at (5) permuting the source data that was obtained from the specified positions within the data structures stored in the three identified source vector registers to include in a destination vector. In one embodiment, permuting the data obtained by a VPGET3 instruction may include assembling data elements of the same type that were extracted from the three source registers next to each other for inclusion in the destination vector. For example, the data elements that were extracted from the first data structure in the first source vector register may be placed next to each other in the destination vector. In one embodiment, permuting the data obtained by a first VPGET4 instruction may include assembling data elements of the same type from two source vector registers and placing them in the lower-order half of the destination register (with offset 0). Subsequently, permuting the data obtained by a second VPGET4 instruction may include assembling data elements of the same type from two other source vector registers and placing them in the upper-order half of the destination register (with offset 8) while retaining the contents of the lower-order half of the destination register as an additional source of data elements.

In one embodiment, execution of the VPGET3 or VPGET4 instruction may include repeating any or all of steps of the operations illustrated in FIG. 21 for each of the data structures whose data is stored as packed data in the three source vector registers 2101, 2102, and 2103. In this example, following the placement of the data elements that were extracted from the first data structure in the first source vector register in the destination vector, the data elements that were extracted from the remaining data structures in the first source vector register may be placed next to each other in the destination vector. Subsequently, the data elements that were extracted from the data structures in the second source vector register may be placed next to each other in the destination vector, and the data elements that were extracted from the data structures in the third source vector register may be placed next to each other in the destination vector. For example, steps (2), (3), (4), and (5) may be performed once for each of the data structures from which a data element is to be extracted and included in the destination vector. In one embodiment, for each additional iteration, SIMD execution unit 1912 may extract the data elements from the same position in one of the data structures within the three source vector registers and assemble them next to each other for inclusion in the destination vector.

After assembling the destination vector, execution of the VPGET3 or VPGET4 instruction may include, at (6), writing the destination vector to a destination vector register in extended vector register file 1914 that was identified by a parameter of the VPGET3 or VPGET4 instruction, after which the VPGET3 or VPGET4 instruction may be retired. In this example, the vector register identified as the first source vector register (2101) also serves as the destination (result) vector register for this instruction. Therefore, at least some of the source data stored in vector register 2101 may be overwritten by the data in the destination vector (dependent on whether or not masking is applied to the destination vector). In another example, a parameter of the VPGET3 or VPGET4 instruction may identify another extended vector register ZMMn as the destination (result) vector register for the VPGET3 or VPGET4 instruction, and SIMD execution unit 1912 may store the data elements extracted from the data structures in the three source vector registers (2101, 2102, 2103) to the identified destination vector register. In one embodiment, an offset parameter specified for a VPGET4 instruction may indicate the location in the destination vector register at which the data elements extracted from two source vector registers at a time are to be stored. In one embodiment, writing the destination vector to the destination vector register may include applying a merging-masking operation to the destination vector, if such a masking operation is specified in the call of the VPGET3 or VPGET4 instruction. In another embodiment, writing the destination vector to the destination vector register may include applying a zero-masking operation to the destination vector, if such a masking operation is specified in the call of the VPGET3 or VPGET4 instruction.

In one embodiment, as data elements from each data structure are extracted from the source vector registers, and assembled next to each other, they may be stored to the destination vector register. For example, once the specified data elements have been extracted from the first data structure and have been assembled in the destination vector, these extracted data elements may be written to contiguous locations in the destination vector register. Subsequently, once the specified data elements have been extracted from the second data structure and have been assembled in the destination vector, these additional extracted data elements may be written to contiguous locations in the destination vector register, and so on.

In one embodiment, the extended SIMD instruction set architecture may implement multiple versions or forms of an operation to extract data elements of the same type from a packed vector register including, for example, those shown below:

VPGET3 {X/Y/Z}{size} {kn} {z} (REG, REG, REG)
VPGET4{X/Y/Z/W}{size} {kn} {z} (REG, REG, REG, imm)

In these example forms of the VPGET3 and VPGET4 instructions, the value of the parameter {X/Y/Z} for the VPGET3 instruction may indicate which of the data elements in each three-element data structure should be extracted by the instruction. Similarly, the value of the parameter {X/Y/Z/W} for the VPGET4 instruction may indicate which of the data elements in each four-element data structure should be extracted by the instruction. In these examples, the first REG parameter may identify an extended vector register that serves as the first source vector register for the instruction and also as the destination vector register for the instruction. In these examples, the second REG parameter may identify the second source vector register for the instruction and the third REG parameter may identify the third source vector register for the instruction. In these examples, the "size" modifier may specify the size and/or type of the data elements in the source vector registers. This may correspond to the size and/or type of the data elements in each data structure represented by the packed data stored in the source vector registers. In one embodiment, the specified size/type may be one of {B/W/D/Q/PS/PD}.

In these examples, the optional instruction parameter "$k_n$" may identify a particular one of multiple mask registers. This parameter may be specified when masking is to be applied to the destination (result) vector for the VPGET3 or VPGET4 instruction. In embodiments in which masking is to be applied (e.g., if a mask register is specified for the instruction), the optional instruction parameter "z" may indicate whether or not zeroing-masking should be applied. In one embodiment, zero-masking may be applied if this optional parameter is set, and merging-masking may be applied if this optional parameter is not set or if this optional parameter is omitted. In the example form of the VPGET4 instruction shown above, the immediate parameter may specify an integer destination offset value for the VPGET4 instruction. This destination offset value may indicate the starting position in the destination vector register at which the results of the instruction should be written. In other embodiments (not shown), a VPGET3 or VPGET4 instruction may include a parameter indicating the number of lanes or data structures in each of the source vector registers (e.g., 4, 3, or 2).

Figure 22A:
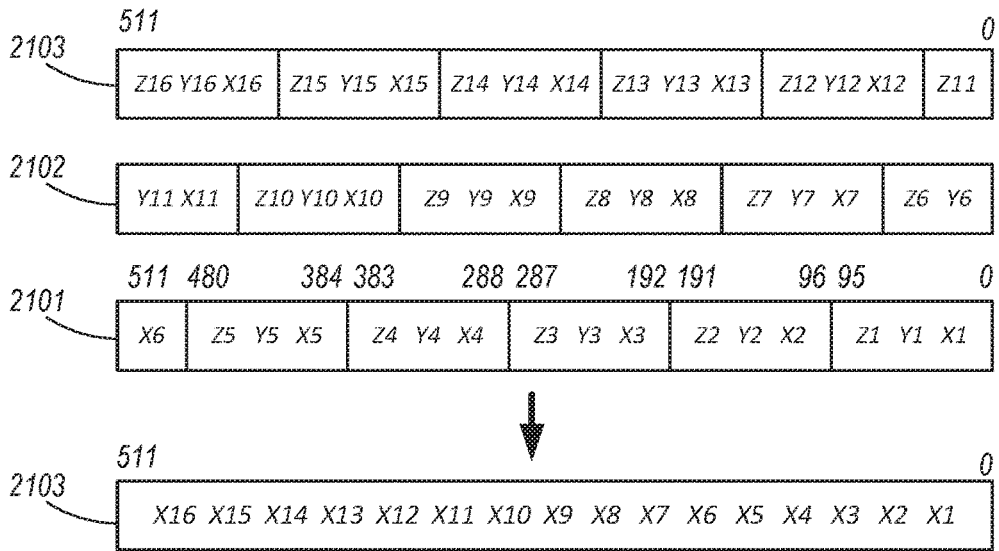
FIGS. 22A-22D illustrate the operation of respective forms of VPGET3 and VPGET4 instructions, in accordance with embodiments of the present disclosure.

FIGS. 22A-22D illustrate the operation of respective forms of VPGET3 and VPGET4 instructions, in accordance with embodiments of the present disclosure. More specifically, FIG. 22A illustrates the operation of an example VPGET3XD instruction without masking (a "VPGET3XD (REG, REG, REG)" instruction). In this example, packed data stored collectively in a three source vector registers (e.g., ZMMn registers) 2101, 2102, and 2103 includes the data elements for sixteen data structures, each of which includes three 32-bit doublewords. In one embodiment, each of the data structures may represent a row of an array. In this example, in each data structure (or row) includes an X component, a Y component, and a Z component. The data elements for each data structure (row) in the array have been loaded into 96 bits in one of the source vector registers or in 96 bits that span two of the source vector registers prior to execution of the VPGET3XD instruction. In this example, the first source vector register 2101 stores the first five data structures, each including three 32-bit doublewords: an X component, a Y component, and a Z component. In this example, the highest-order 32 bits of the first source vector register 2101 also stores the first data element of a sixth data structure (X6), while the remaining data elements of the sixth data structure (Y6 and Z6) are stored in the lowest-order 64 bits of the second source vector register 2102. In this example, the second source vector register 2102 also stores the next four data structures (each including an X component, a Y component, and a Z component) and the first two elements of the eleventh data structure (X11 and Y11). Finally, the third source vector register 2103 stores the remaining data element of the eleventh data structure (Z11), and the last five data structures, each including an X component, a Y component, and a Z component.

In one embodiment, a VPGET3XD instruction may be used to extract the data elements representing the X components of each of the data structures stored collectively in the three source vector register 2101, 2102, and 2103. For example, execution of the VPGET3XD instruction may cause the data elements in the first position within each data structure stored in the three source vector registers (the X components) to be extracted from the three source vector registers. Execution of the VPGET3XD instruction may cause these extracted data elements to be stored to contiguous locations in a destination vector register 2103.

Figure 22B:
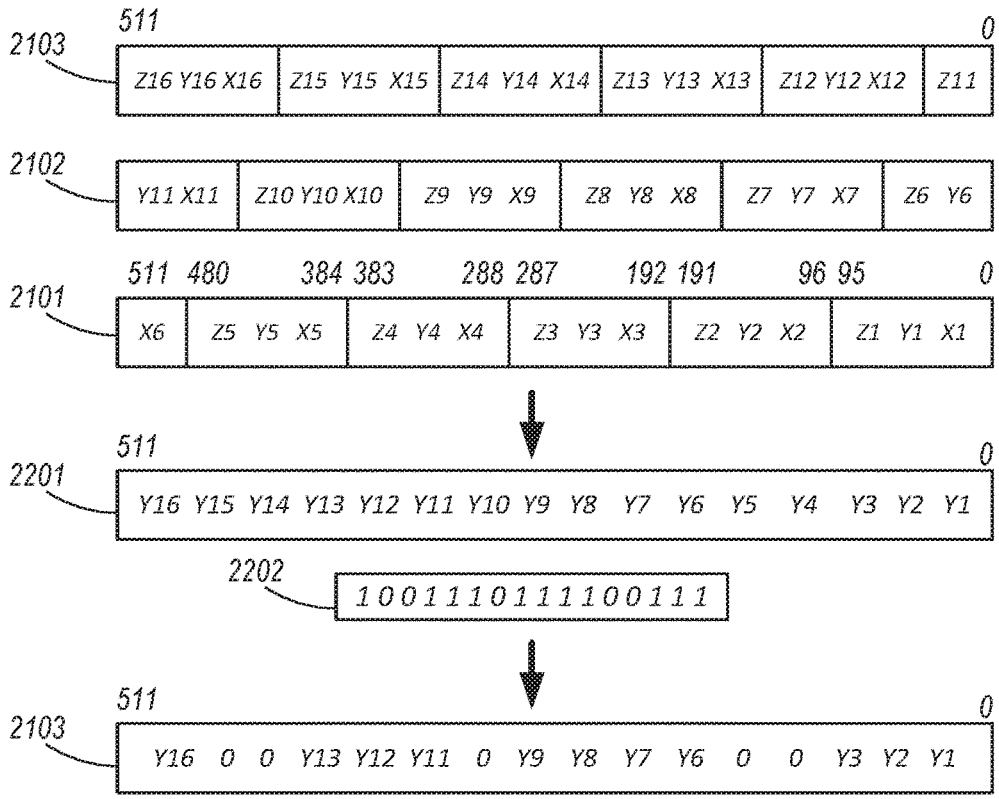

FIG. 22B illustrates the operation of an example VPGET3YD instruction with masking (a "VPGET3XD kn z (REG, REG,REG)" instruction), in accordance with embodiments of the present disclosure. In this example, the source vector registers 2101, 2102, and 2103 may be the same source vector registers illustrated in FIG. 22A. In this example, these source vector registers were preloaded with data elements corresponding to sixteen three-element data structures, as described above. In one embodiment, a VPGET3YD instruction may be used to extract the data elements representing the Y components of each of the data structures stored collectively in the three source vector register 2101, 2102, and 2103. For example, execution of the VPGET3YD instruction may cause the data elements in the second position within each data structure stored in the three source vector registers (the Y components) to be extracted from the three source vector registers and placed in a destination vector 2201. In this example, however, a masking operation may be applied to the destination vector 2201 prior to storing it to contiguous locations in the destination vector register 2103. In this example, the specified mask register 2202 includes a zero in the fourth, fifth, tenth, fourteenth, and fifteenth bits (e.g., bits 3, 4, 9, 13, and 14). Therefore, rather than storing the data elements in these positions within the destination vector to the destination vector register, zeros may be written into the corresponding positions in the destination vector register. In one embodiment, a VPGET3Z instruction may be executed to extract the data elements representing the Z components of each of the data structures stored collectively in the three source vector register 2101, 2102, and 2103. For example, execution of the VPGET3ZD instruction may cause the data elements in the third position within each data structure stored in the three source vector registers (the Z components) to be extracted from the three source vector registers and placed in a destination vector.

Figure 22C:
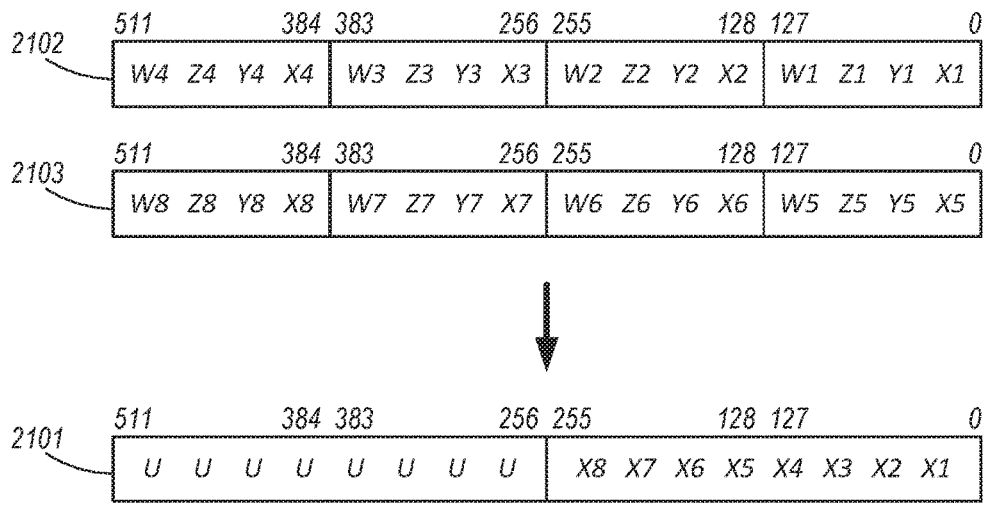

FIG. 22C illustrates the operation of an example VPGET4XD instruction with a destination offset parameter value of 0 (a "VPGET4XD (REG, REG, REG, 0)" instruction), in accordance with embodiments of the present disclosure. In this example, the first source vector register 2101, which also serves as the destination vector register, does not contain any data representing source data elements for the VPGET4XD instruction. However, some of the data in the first source vector register 2101 may be preserved following execution of the VPGET4XD instruction. In this example, packed data stored in each of the two source vector registers 2102 and 2103 includes the data elements for four data structures, each of which contains four 32-bit doublewords. In one embodiment, each of the four data structures may represent a row of an array. In this example, in each data structure (or row) includes an X component, a Y component, a Z component, and a W component. The data elements for each data structure (row) in the array have been loaded into respective 128-bit lanes of the second source vector register (an extended vector register ZMMn 2102) and the third source vector register (an extended vector register ZMMn 2103) prior to execution of the VPGET4XD instruction. In this example, the lowest-order 128 bits of the source vector register 2102, which may be referred to as the first lane of the second source vector register, contain four 32-bit doublewords representing the data elements of the first data structure stored in the source vector registers: X1, Y1, Z1, and W1. In this example, the next-lowest-order 128 bits of the second source vector register 2102, which may be referred to as the second lane of the second source vector register, contain four 32-bit doublewords representing the data elements of the second data structure stored in the source vector registers: X2, Y2, Z2, and W2. Similarly, the next-lowest-order 128 bits of the second source vector register 2102, which may be referred to as the third lane of the second source vector register, contain four 32-bit doublewords representing the data elements of the third data structure stored in the source vector registers: X3, Y3, Z3, and W3; and the highest-order 128 bits of the second source vector register 2101, which may be referred to as the fourth lane of the second source vector register, contain four 32-bit doublewords representing the data elements of the fourth data structure stored in the source vector registers: X4, Y4, Z4, and W4.

In this example, the lowest-order 128 bits of the third source vector register 2103, which may be referred to as the first lane of the third source vector register, contain four 32-bit doublewords representing the data elements of the fifth data structure stored in the source vector registers: X5, Y5, Z5, and W5. In this example, the next-lowest-order 128 bits of the third source vector register 2103, which may be referred to as the second lane of the third source vector register, contain four 32-bit doublewords representing the data elements of the sixth data structure stored in the source vector registers: X6, Y6, Z6, and W6. Similarly, the next-lowest-order 128 bits of the third source vector register 2103, which may be referred to as the third lane of the third source vector register, contain four 32-bit doublewords representing the data elements of the seventh data structure stored in the source vector registers: X7, Y7, Z7, and W7; and the highest-order 128 bits of the third source vector register 2102, which may be referred to as the fourth lane of the third source vector register, contain four 32-bit doublewords representing the data elements of the eighth data structure stored in the source vector registers: X8, Y8, Z8, and W8.

In one embodiment, a VPGET4XD instruction with an offset of 0 may be used to extract the X data elements from the two source vector registers 2102 and 2103. Execution of the VPGET4XD instruction may cause these extracted data elements to be stored to contiguous locations in a destination vector register 2101 beginning at the lowest-order position (at offset 0). In this example, the upper portion of destination vector register 2101 is unused and its contents may be unchanged by the execution of the VPGET4XD instruction.

Figure 22D:
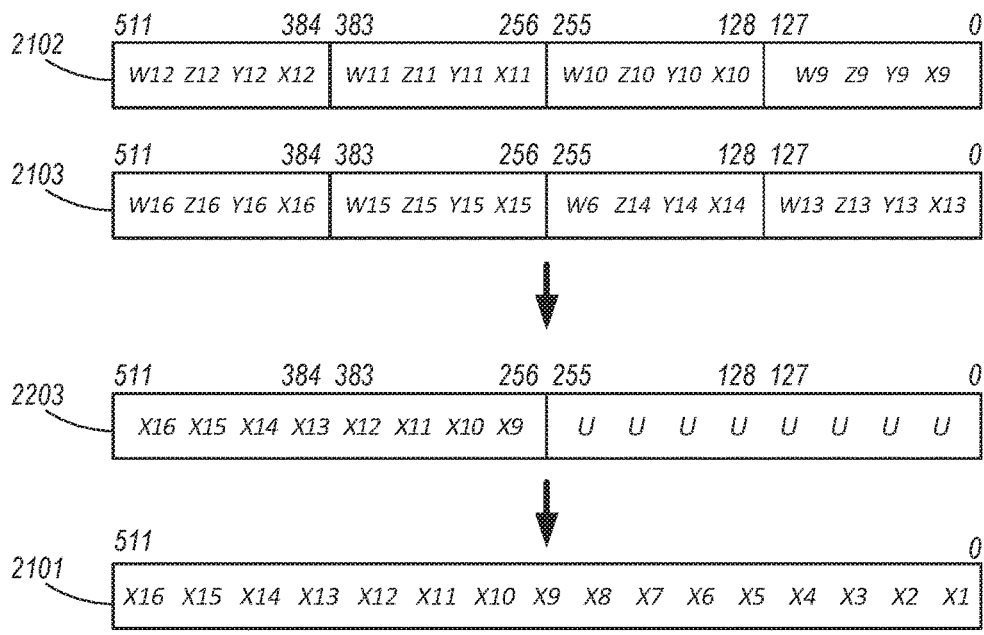

FIG. 22D illustrates the operation of a second VPGET4XD instruction (a "VPGET4XD (REG, REG, REG, 8)" instruction), in accordance with embodiments of the present disclosure. In this example, the second VPGET4XD instruction has a destination offset parameter value of 8. In this example, the lowest-order eight positions of the first source vector register 2101, which also serves as the destination vector register for this instruction, contain the result data that was stored to the first source vector register 2101 by the VPGET4XD instruction illustrated in FIG. 22C and described above. Thus, the first source vector register 2101 may contribute this result data to the destination vector for the second VPGET4XD instruction. In this example, the packed data stored in each of the two source vector registers 2102 and 2103 may include the data elements for four additional data structures, each of which contains four 32-bit doublewords. In one embodiment, each of the four data structures may represent a row of an array. In this example, in each data structure (or row) includes an X component, a Y component, a Z component, and a W component. More specifically, source vector register 2102 has been loaded with the data elements of ninth, tenth, eleventh, and twelfth data structures, and source vector register 2103 has been loaded with the data elements of thirteenth, fourteenth, fifteenth, and sixteenth data structures.

In one embodiment, a VPGET4XD instruction with an offset of 8 may be used to extract the X data elements from the additional data structures that have been loaded into the two source vector registers 2102 and 2103. Execution of the VPGET4XD instruction may cause these extracted data elements to be stored to contiguous locations in a destination vector 2203 beginning at the ninth position (at offset 8). In this example, the lower-order portion of destination vector 2203 is unused by the second VPGET4XD instruction. In this example, only the data elements that were produced by the execution of the second VPGET4XD instruction are stored to destination vector register 2101 by the second VPGET4XD instruction, and they are stored in the upper half of destination vector register 2101 (in the same positions as in destination vector 2203). The results of the first VPGET4XD instruction remain unchanged in the lower half destination vector register 2101. Therefore, following the execution of the first and second VPGET4XD instructions, the destination vector register may contain all of the X components for sixteen source data structures that were extracted eight at a time by these VPGET4XD instructions.

In one embodiment, additional VPGET4 instructions may be executed to extract all of the Y components, Z components, or W components of the data structures stored in two source vector registers 2101 and 2102 at a time. As a result of the execution of each such instruction, the extracted data elements may be stored next to each other in one half of a destination vector register (dependent on the destination offset parameter specified for the instruction). By executing two VPGET4 instructions targeting the same data structure components (Y, Z, or W components), but having different destination offset values (0 or 8), similar components may be extracted from up to sixteen data structures coming from four source vector register.

The forms of the VPGET3 and VPGET4 instructions illustrated in FIGS. 22A-22D are merely examples of the many forms that these instructions can take. In other embodiments, the VPGET3 and VPGET4 instructions may take any of a variety of other forms in which different combinations of instruction modifier values and instruction parameter values are included in the instructions or are specified when the VPGET3 or VPGET4 instructions are called. For example, if merging-masking is specified for a VPGET3 or VPGET4 instruction, the contents of the locations in the destination vector register to which data elements corresponding to that mask register bit would otherwise have been stored may be preserved.

Figure 23:
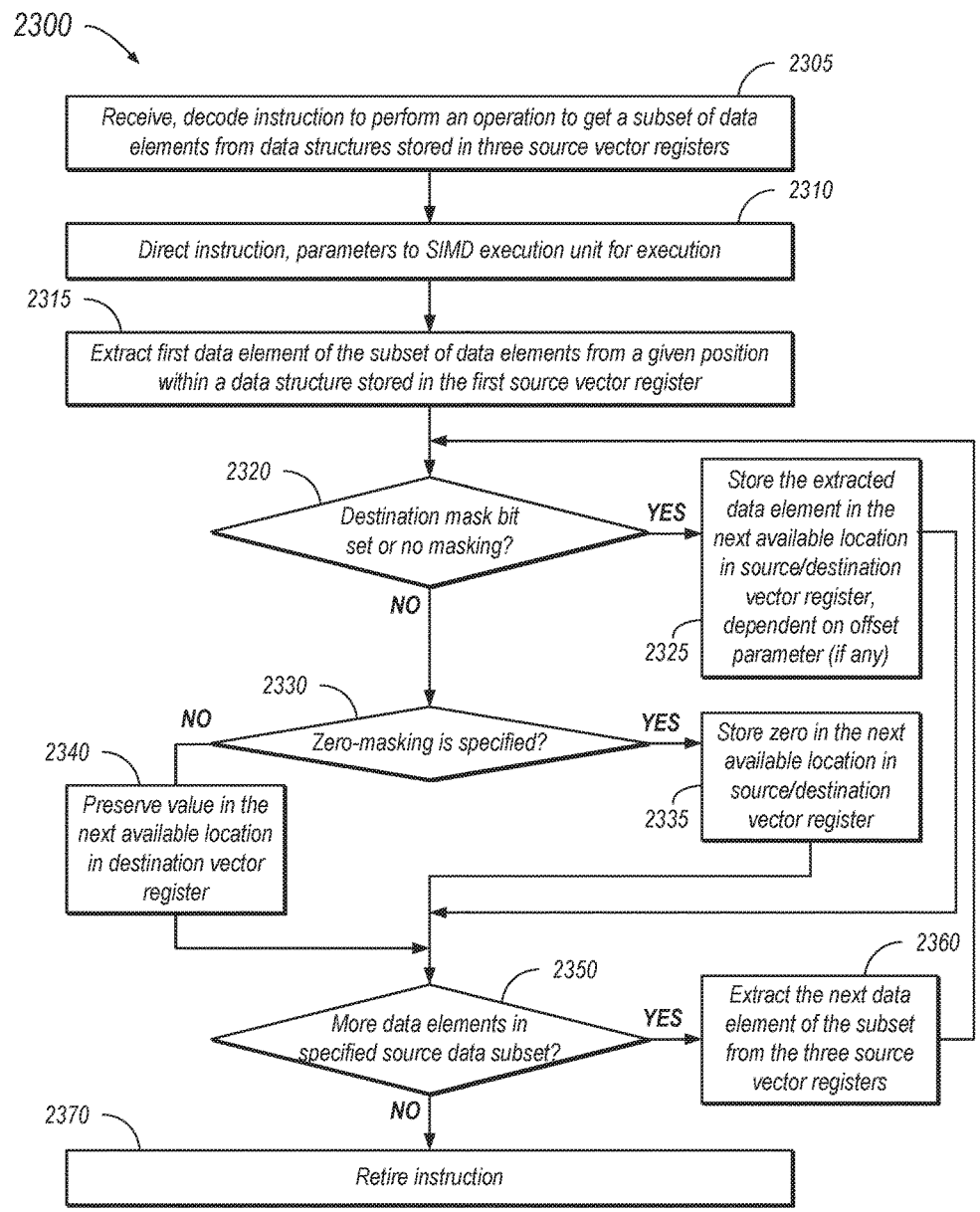
FIG. 23 illustrates an example method for getting multiple vector elements of the same type from data structures in different source registers, in accordance with embodiments of the present disclosure.

FIG. 23 illustrates an example method 2300 for getting multiple vector elements of the same type from data structures in different source registers, according to embodiments of the present disclosure. Method 2300 may be implemented by any of the elements shown in FIGS. 1-22. Method 2300 may be initiated by any suitable criteria and may initiate operation at any suitable point. In one embodiment, method 2300 may initiate operation at 2305. Method 2300 may include greater or fewer steps than those illustrated. Moreover, method 2300 may execute its steps in an order different than those illustrated below. Method 2300 may terminate at any suitable step. Moreover, method 2300 may repeat operation at any suitable step. Method 2300 may perform any of its steps in parallel with other steps of method 2300, or in parallel with steps of other methods. Furthermore, method 2300 may be executed multiple times to perform getting multiple vector elements of the same type from data structures in different source registers.

At 2305, in one embodiment, an instruction to perform an operation to get a subset of data elements from data structures stored in three source vector registers (e.g., a VPGET3 or VPGET4 instruction) may be received and decoded. At 2310, the instruction and one or more parameters of the instruction may be directed to a SIMD execution unit for execution. In some embodiments, the instruction parameters may include identifiers of three source vector registers, at least two of which contain packed data, an identifier of a destination vector register (which may be the same as the first source vector register), an indication of which of the data elements of each data structure should be extracted, an indication of the size of the data elements in each data structure represented by the packed data, an indication of the number of data elements in each data structure represented by the packed data, a destination offset parameter value, a parameter identifying a particular mask register, or a parameter specifying a masking type.

At 2315, a first data element of the specified subset of data elements may be extracted from a given position within a data structure stored in the first source vector register. In one embodiment, the encoding (opcode) of the instruction may indicate whether the first, second, third, or fourth data elements of each data structure are to be extracted by the instruction. In one embodiment, the value of a single bit or field in the encoding of the instruction may indicate whether three or four data elements are included in the data structures from which data elements are to be extracted by the instruction.

If (at 2320) it is determined that a destination mask bit set corresponding to the extracted data element is set or that no masking has been specified for the VPGET3 or VPGET4 operation, then at 2325 the extracted data element may be stored in the next available location in the first source/destination vector register, dependent on the value of an offset parameter (if any) that was specified for the instruction. In one embodiment, there may be a respective bit in the identified mask register for each data element in the source vector registers (e.g., for each data element to be stored in the destination vector register). In another embodiment, there may be a respective bit in the identified mask register for each lane or data structure in the source vector registers. In yet another embodiment, there may be a respective bit in the identified mask register for each lane in the destination vector register. If (at 2320) it is determined that the destination mask bit corresponding to the extracted data element is not set, and if (at 2330) it is determined that zero-masking is specified, then at 2335 zeros may be stored in the location in the destination vector register that would otherwise have stored the extracted data element. If (at 2320) it is determined that the destination mask bit corresponding to the extracted data element is not set, and if (at 2330) it is determined that zero-masking is not specified (for example, if merging-masking is specified or that neither zero-masking nor merging-masking is specified), then at 2340 the values currently stored in the location within the destination vector register that would otherwise have stored the extracted data element may be preserved.

If, at 2350, it is determined that there are more data elements in the specified subset of the source data to be extracted from the source vector registers, then, at 2360, the next data element of the specified subset of source data from the three source vector registers may be extracted from one of the source vector registers. In this case, at least some of the operations illustrated in 2320-2340 may be repeated for the newly extracted data element. In one embodiment, the operations illustrated in 2320-2360 may be repeated one or more times in order to extract all of the data elements of the specified subset of source data from the data structures stored in the source vector registers. For example, these operations may be repeated until all of the data elements of a given type have been extracted from the data structures in the source vector registers. Once there are no additional data elements to be extracted from the source vector registers (as determined at 2350), the instruction may be retired at 2370.

In embodiments of the present disclosure, a first sequence of instructions may be executed to preload the data elements of multiple data structures into source vector registers prior to executing VPGET3 or VPGET4 instructions. Subsequently, a second sequence of instructions that includes multiple VPGET3 and VPGET4 instructions may be executed to extract the data elements of different types into separate vector registers. An example of a first sequence of instructions to preload the data for a VPGET3 instruction is illustrated by the example pseudo code below. In this example, it is assumed that, prior to execution of the first sequence of instructions, the data elements of sixteen XYZ-type data structures are stored in contiguous locations in memory as X1Y1 Z1, X2 Y2 Z2, and so on.

VPMOVD zmm3, [mem]
//zmm3=x1 y1 z1 x2 y2 z2 x5 y5 z5 x6
VPMOVD zmm4, [mem+64]
//zmm4=y6 z6 x7 y7 z7 . . . x10 y10 z10 x11 y11
VPMOVD zmm5, [mem+128]
//zmm5=z11 x12 y12 z12 . . . x16 y16 z16

In this example, three vector move instructions are used to pack each of three extended vector registers (ZMM3-ZMM5) with data elements representing a total of sixteen XYZ-type data structures. More specifically, these vector move instructions are used to pack the three 32-bit values (an X component, a Y component, and a Z component) of a respective data structure in the memory into 96 bits in the one of the extended vector registers or into 96 bits spanning two of the extended vector registers. An example of the second sequence of instructions is illustrated by the example pseudo code below.

VPMOVD zmm1, zmm3
VPGET3XD zmm1, zmm4, zmm5
//zmm1 =x1 . . . x16
VPMOVD zmm2, zmm3
VPGET3YD zmm2, zmm4, zmm5
//zmm2 =y1. . . y16
VPGET3ZD zmm3, zmm4, zmm5
//zmm3 =z1 . . . z16

In this example, the VPGET3D form of the VPGET3 instruction specifies that each data element is a 32-bit quadword. In this example, once the vector registers ZMM3-ZMM5 have been packed with the data elements representing the sixteen data structures, they may serve as the source vector registers for the three VPGET3D instructions. In this example, a first VPGET3D instruction (in this case, a VPGET3XD instruction) is executed to extract all of the X components from the source vector registers and to place them in a destination vector register. Similarly, a second VPGET3D instruction (in this case, a VPGET3YD instruction) is executed to extract all of the Y components from the source vector registers and to place them in a second destination vector register, and a third VPGET3D instruction (in this case, a VPGET3ZD instruction) is executed to extract all of the Z components from the source vector registers and to place them in a third destination vector register. Note that, since the first source vector register for each instruction also serves as the destination vector register for the instruction, the original contents of the source vector register into which the destination will be written is copied to another vector register prior to executing the instruction. As a result of the execution of these three instructions, each of the vector registers ZMM1-ZMM3 may store sixteen data elements of the same type (e.g., sixteen X components, sixteen Y components, or sixteen Z components, respectively) that were extracted from the source vector registers ZMM3-ZMM5.

Figure 24A:
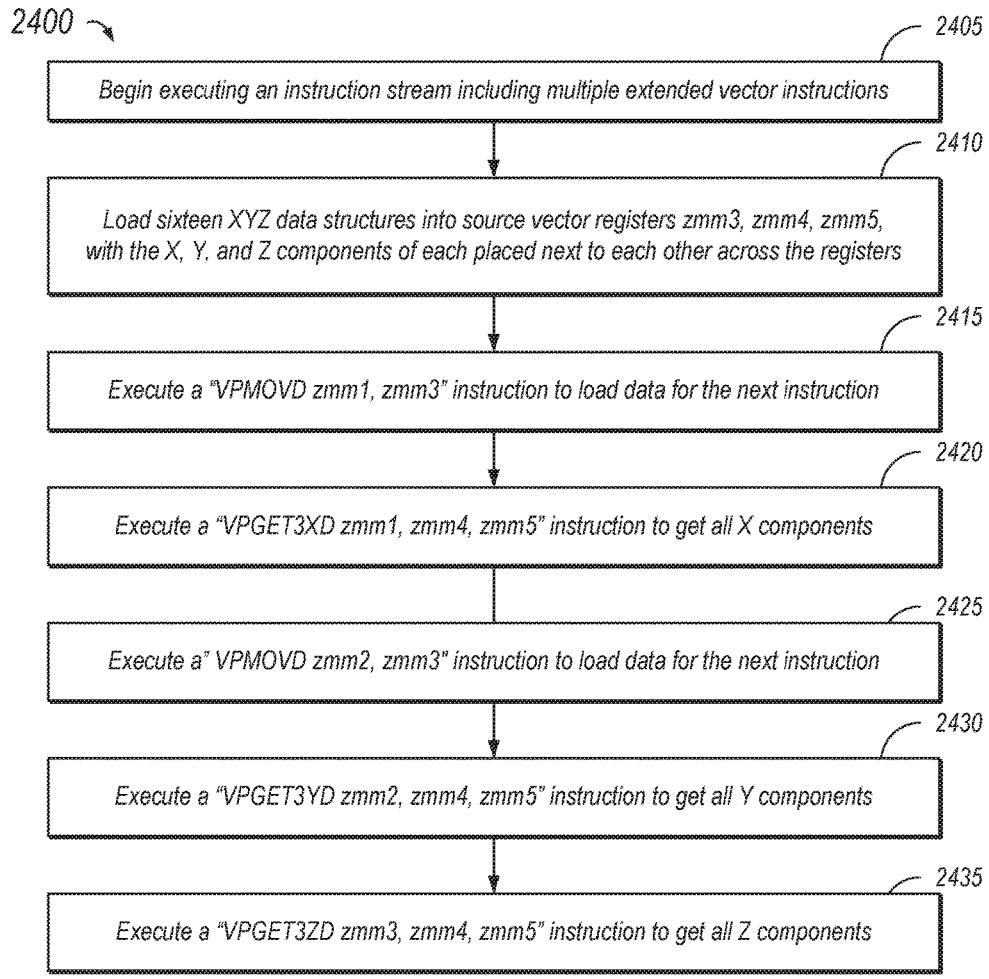
FIGS. 24A and 24B illustrate an example method for utilizing multiple vector GET3 operations to obtain and permute the data elements of multiple data structures from different sources, according to embodiments of the present disclosure.
Figure 24B:
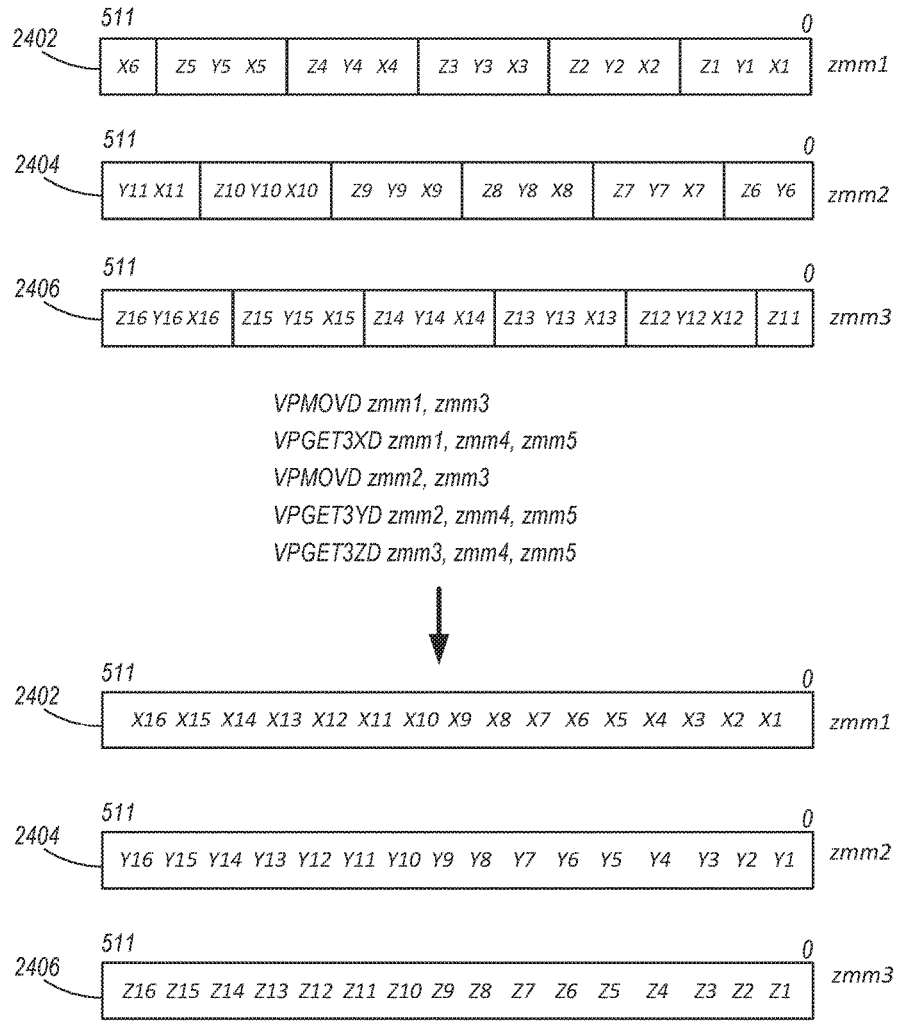

One example application of vector GET3 type operations is illustrated in FIGS. 24A and 24B. More specifically, FIG. 24A illustrates an example method 2400 for utilizing multiple vector GET3 operations to obtain and permute the data elements of multiple data structures from different sources, according to embodiments of the present disclosure. In this example method, three source vector registers are preloaded with packed data elements representing sixteen data structures, after which multiple vector GET3 instructions are called to extract the data elements of different types and store them in separate destination vector registers. Method 2400 may be implemented by any of the elements shown in FIGS. 1-22. Method 2400 may be initiated by any suitable criteria and may initiate operation at any suitable point. In one embodiment, method 2400 may initiate operation at 2405. Method 2400 may include greater or fewer steps than those illustrated. Moreover, method 2400 may execute its steps in an order different than those illustrated below. Method 2400 may terminate at any suitable step. Moreover, method 2400 may repeat operation at any suitable step. Method 2400 may perform any of its steps in parallel with other steps of method 2400, or in parallel with steps of other methods. Furthermore, method 2400 may be executed multiple times to utilize multiple vector GET3 operations to obtain and permute the data elements of multiple data structures from different sources.

At 2405, in one embodiment, execution of an instruction stream including multiple extended vector instructions may begin. At 2410, three 512-bit source vector registers may be loaded with sixteen three-element data structures such that the 32-bit X, Y, and Z components of each data structure are placed next to each other across the three source vector registers, collectively. The three data elements in each data structure may be of different types. In one embodiment, the data elements may be loaded into the source vector registers from memory. In another embodiment, the data elements may be loaded into the source vector registers from general-purpose registers. In yet another embodiment, the data elements may be loaded into the vector register from other vector registers.

At 2415, in one embodiment, the sixteen lowest-order data elements from the first source vector register may be copied to a first source/destination vector register for a VPGET3XD instruction. At 2420, a VPGET3XD instruction may be executed to extract the X components from each data structure in the first source/destination register and in the second and third source vector registers and to place the extracted data elements in the first source/destination vector register At 2425, in one embodiment, the sixteen lowest-order data elements from the first source vector register may be copied to a second source/destination vector register for a VPGET3YD instruction. At 2430, a VPGET3YD instruction may be executed to extract the Y components from each data structure in the second source/destination register and in the second and third source vector registers and to place the extracted data elements in the second source/destination vector register.

At 2435, a VPGET3ZD instruction may be executed to extract the Z components from each data structure in the third source/destination register and in the second and third source vector registers and to place the extracted data elements in the third source/destination vector register. In this example, following the execution of method 2400, each of the first, second, and third destination vector registers may store data elements of the same type that were extracted from the same position within each of the sixteen data structures represented in the original three source vector registers.

FIG. 24B further illustrates the example method 2400 shown in FIG. 24A. In this example, prior to execution of the sequence of vector instructions described above, vector register ZMM1 (2402) stores the first third of the data elements of sixteen XYZ data structures, vector register ZMM2 (2404) stores the second third of the data elements of the sixteen XYZ data structures, and vector register ZMM3 (2406) stores the remaining data elements of the sixteen XYZ data structures. Following the execution of the sequence of instructions, which are shown in FIG. 24B, vector register ZMM1 (2402) stores all sixteen of the X components of the sixteen data structures, vector register ZMM2 (2404) stores all sixteen of the Y components of the sixteen data structures, and vector register ZMM3 (2406) stores all sixteen of the Z components of the sixteen data structures.

An example of a first sequence of instructions to preload the data for a VPGET4 instruction is illustrated by the example pseudo code below. In this example, it is assumed that, prior to execution of the first sequence of instructions, the data elements of sixteen XYZW-type data structures are stored in contiguous locations in memory as X1 Y1 Z1 W1, X2 Y2 Z2 W2, and so on.

VPMOVD zmm5, [mem]
//zmm5 =x1 y1 z1 w1 x2 y2 z2 w2 . . . x4 y4 z4 w4
VPMOVD zmm6, [mem+64]
//zmm6 =x5 y5 z5 w5 . . . x8 y8 z 8 w8
VPMOVD zmm7, [mem+128]
//zmm7 =x9 y9 z9 w9 . . . x12 y12 z12 w12
VPMOVD zmm8, [mem+192]
//zmm8 =x13 y13 z13 w13 . . . x16 y16 z16 w16

In this example, four vector move instructions are used to pack each of four extended vector registers (ZMM5-ZMM8) with data elements representing a total of sixteen XYZW-type data structures. More specifically, these vector move instructions are used to pack the four 32-bit values (an X component, a Y component, a Z component, and a W component) of each respective data structure in the memory into a 128-bit lane in the one of the extended vector registers. An example of the second sequence of instructions for creating vectors of like elements using multiple VPGET4 instructions is illustrated by the example pseudo code below.

VPGET4XD zmm1, zmm5, zmm6, 0
//zmm1 =x1 . . . x8, ===letter U means unused element
VPGET4XD zmm1, zmm7, zmm8, 8
//zmm1 =x1 . . . x16
VPGET4YD zmm2, zmm5, zmm6, 0
//zmm2 =y1 . . . y8, UUUUUUUU
VPGET4YD zmm2, zmm7, zmm8, 8
//zmm2 =y1 . . . y16
VPGET4ZD zmm3, zmm5, zmm6, 0
//zmm3 =z1 . . . z8,
VPGET4ZD zmm3, zmm7, zmm8, 8
//zmm3 =z1 . . . z16
VPGET4WD zmm4, zmm5, zmm6, 0
//zmm4 =w1 . . . w8,
VPGET4WD zmm4, zmm7, zmm8, 8
//zmm4 =w1 . . . w16

In this example, the VPGET4D form of the VPGET4 instruction specifies that each data element is a 32-bit quadword. In this example, once the vector registers ZMM5-ZMM8 have been packed with the data elements representing the sixteen data structures, they may serve as the source vector registers for the four VPGET4D instructions. In this example, a first VPGET4D instruction (in this case, a VPGET4XD instruction with an offset of 0) is executed to extract all of the X components from the first two source vector registers and to place them in the lower half of a first destination vector register. Subsequently, a second VPGET4D instruction (in this case, a VPGET4XD instruction with an offset of 8) is executed to extract all of the X components from the third and fourth source vector registers and to place them in the upper half of the same (first) destination vector register. Similarly, a second pair of VPGET3D instructions (in this case, a pair of VPGET3YD instructions with different destination offset values) is executed to extract all of the Y components from the source vector registers and to place them in the lower and upper halves of the second destination vector register, respectively, a third pair of VPGET3D instructions (in this case, a pair of VPGET3ZD instructions with different destination offset values) is executed to extract all of the Z components from the source vector registers and to place them in the lower and upper halves of a third destination vector register, respectively, and a fourth pair of VPGET3D instructions (in this case, a pair of VPGET3WD instructions with different destination offset parameter values) is executed to extract all of the W components from the source vector registers and to place them in the lower and upper halves of a fourth destination vector register, respectively.

In this example, since the first source vector register for each instruction also serves as the destination vector register for the instruction, but only half of the destination register is affected by each instruction, the result data written to each of the destination vector registers by the first VPGET3D instruction in each pair may contribute to the result of the second VPGET3D instruction in the pair. As a result of the execution of these eight instructions, each of the vector registers ZMM1-ZMM4 may store sixteen data elements of the same type (e.g., sixteen X components, sixteen Y components, sixteen Z components, or sixteen W components, respectively) that were extracted from the source vector registers ZMM5-ZMM8.

Figure 25A:
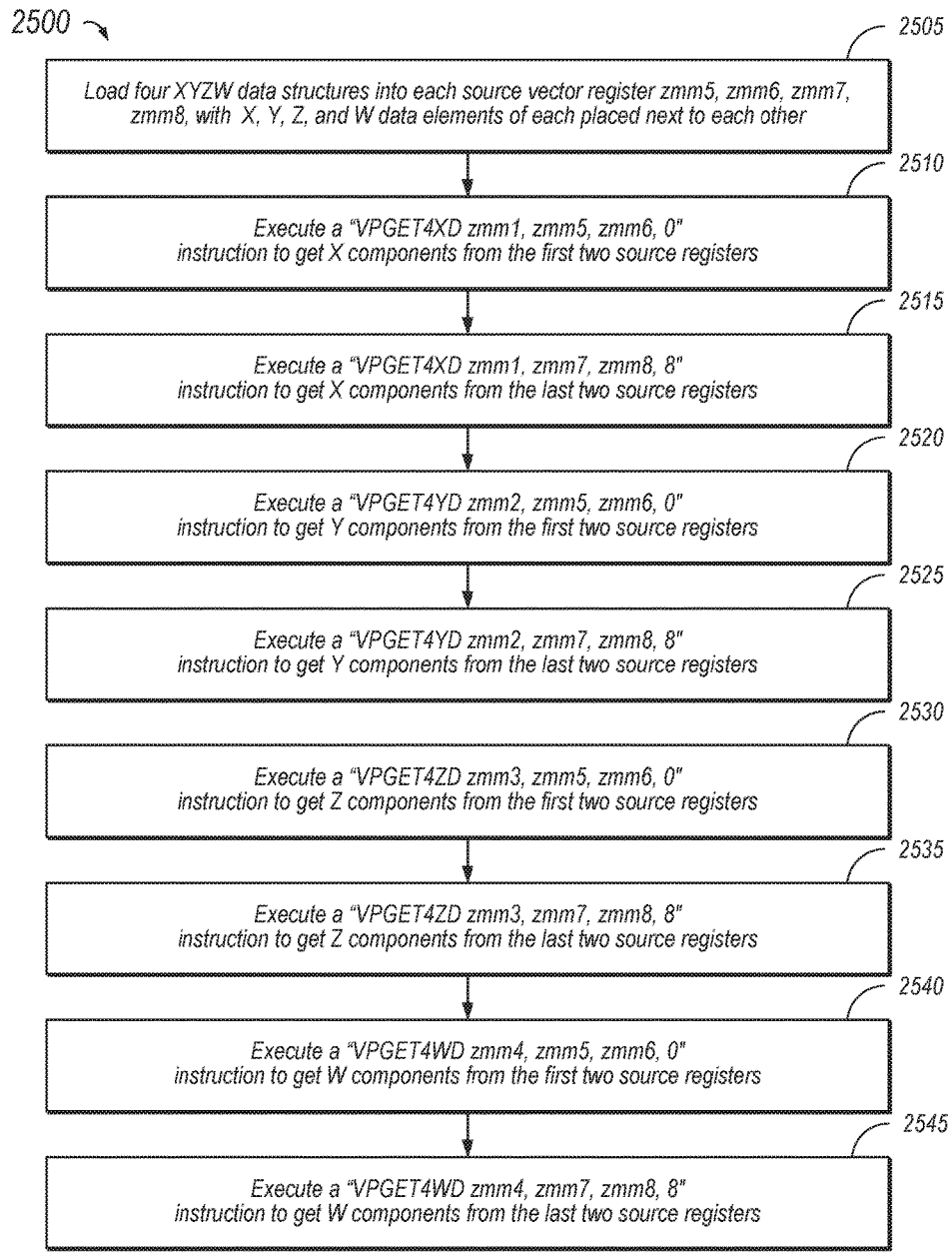
FIGS. 25A and 25B illustrate an example method for utilizing multiple vector GET4 operations to obtain and permute the data elements of multiple data structures from different sources, according to embodiments of the present disclosure.
Figure 25B:

One example application of vector GET4 type operations is illustrated in FIGS. 25A and 25B. More specifically, FIG. 25A illustrates an example method 2500 for utilizing multiple vector GET4 operations to obtain and permute the data elements of multiple data structures from different sources, according to embodiments of the present disclosure. In this example method, four source vector registers are preloaded with packed data elements representing sixteen data structures, after which multiple vector GET4 instructions are called to extract the data elements of different types and store them in separate destination vector registers. Method 2500 may be implemented by any of the elements shown in FIGS. 1-22. Method 2500 may be initiated by any suitable criteria and may initiate operation at any suitable point. In one embodiment, method 2500 may initiate operation at 2505. Method 2500 may include greater or fewer steps than those illustrated. Moreover, method 2500 may execute its steps in an order different than those illustrated below. Method 2500 may terminate at any suitable step. Moreover, method 2500 may repeat operation at any suitable step. Method 2500 may perform any of its steps in parallel with other steps of method 2500, or in parallel with steps of other methods. Furthermore, method 2500 may be executed multiple times to utilize multiple vector GET4 operations to obtain and permute the data elements of multiple data structures from different sources.

At 2505, in one embodiment, each of four source vector registers may be loaded with multiple four-element data structures such that the 32-bit X, Y, Z, and W data elements of each data structure are placed next to each other in one of the four source vector registers. At 2510, in one embodiment, a first VPGET4XD instruction may be executed to extract the X components from the data structures in the first and second source vector registers and to place them in a first source/destination vector register in the eight lowest-order positions (with no offset). At 2515, in one embodiment, a second VPGET4XD instruction may be executed to extract the X components from the data structures in the third and fourth source vector registers and to place them in the first source/destination vector register in the eight highest-order positions (with an offset of 8). At 2520, a first VPGET4YD instruction may be executed to extract the Y components from the data structures in the first and second source vector registers and to place them in a second source/destination vector register in the eight lowest-order positions (with no offset). At 2525, in one embodiment, a second VPGET4YD instruction may be executed to extract the Y components from the data structures in the third and fourth source vector registers and to place them in the second source/destination vector register in the eight highest-order positions (with an offset of 8).

At 2530, in one embodiment, a first VPGET4ZD instruction may be executed to extract the Z components from the data structures in the first and second source vector registers and to place them in a third source/destination vector register in the eight lowest-order positions (with no offset). At 2535, in one embodiment, a second VPGET4ZD instruction may be executed to extract the Z components from the data structures in the third and fourth source vector registers and to place them in the third source/destination vector register in the eight highest-order positions (with an offset of 8). At 2540, in one embodiment, a first VPGET4WD instruction may be executed to extract the W components from the data structures in the first and second source vector registers and to place them in a fourth source/destination vector register in the eight lowest-order positions (with no offset). At 2545, in one embodiment, a second VPGET4WD instruction may be executed to extract the W components from the data structures in the third and fourth source vector registers and to place them in the fourth source/destination vector register in the eight highest-order positions (with an offset of 8).

In this example, following the execution of method 2500, each of the first, second, third, and fourth destination vector registers may store data elements of the same type that were extracted from the same position within each of the sixteen data structures represented in the original four source vector registers.

FIG. 25B further illustrates the example method 2500 shown in FIG. 25A. In this example, prior to execution of the sequence of vector instructions described above, vector register ZMM5 (2502) stores the data elements of the first four of sixteen XYZW data structures, vector register ZMM6 (2504) stores the data elements of the second four of the sixteen XYZW data structures, vector register ZMM7 (2506) stores the next four of the sixteen XYZW data structures, and vector register ZMM8 (2508) stores the last four of the sixteen XYZW data structures. Following the execution of the sequence of instructions, which are shown in FIG. 25B, vector register ZMM1 (2512) stores all sixteen of the X components of the sixteen data structures, vector register ZMM2 (2514) stores all sixteen of the Y components of the sixteen data structures, vector register ZMM3 (2516) stores all sixteen of the Z components of the sixteen data structures, and vector register ZMM4 (2518) stores all sixteen of the W components of the sixteen data structures.

In other embodiments of the present disclosure, other sequences of VPGET3 and/or VPGET4 operations may be executed to extract vectors of data elements of the same type from collections of data structures having a different number of data elements. In other embodiments of the present disclosure, other sequences of VPGET3 and/or VPGET4 operations may be executed to extract vectors of data elements of the same type from different numbers of data structures. In still other embodiments of the present disclosure, other sequences of VPGET3 and/or VPGET4 operations may be executed to extract vectors of data elements of the same type from collections of data structures having various strides.

While several examples describe forms of the VPGET3 or VPGET4 instructions that operate on packed data elements that are stored in extended vector registers (ZMM registers), in other embodiments, these instructions may operate on packed data elements that are stored in vector registers having fewer than 512 bits. For example, if the source and/or destination vectors for a VPGET3 or VPGET4 instruction include 256 bits or fewer, the VPGET3 or VPGET4 instruction may operate on a YMM register or an XMM register.

In several of the examples described above, the data elements of each component type are relatively small (e.g., 32 bits) and there are few enough of them that all of them can be stored in a single ZMM register that is the destination vector register for a VPGET3 or VPGET4 instruction. In other embodiments, there may be enough data elements of each component type that (depending on the size of the data elements) they may fill multiple ZMM destination registers. For example, there may be more than 512 bits worth of X values, more than 512 bits worth of Y values, and so on. In one embodiment, the constituent components of a respective subset of the resulting data structures may be packed into each one of multiple ZMM registers by multiple VPGET3 or VPGET4 instructions. In other embodiments, there may be few enough data elements of each component type that (depending on the size of the data elements) they may fit into XMM or YMM destination registers.

As illustrated in the examples above, unlike a standard GET instruction that may take data from a source operand and store it to a destination operand unchanged, the VPGET3 and VPGET4 operations described herein may be used to extract data elements and to permute the data elements of multiple data structures that are stored together within a source vector register in order to separate out data elements that represent different components of each data structure prior to storing the data to its destination operand. Several examples above describe the use of VPGET3 and VPGET4 instructions to extract data elements that represent the constituent components of multiple data structures (such as arrays) in memory. In other embodiments, these operations may, more generally, be used to extract packed data elements from different positions within a source vector register and to permute them dependent on the positions from which they were extracted when storing the contents of the vector register to a destination location, regardless of how (or even whether) the data elements are related to each other.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a front end to receive an instruction, a decoder to decode the instruction, a core to execute the instruction, and a retirement unit to retire the instruction. To execute the instruction, the core may include a first source vector register to store data elements of at least two tuples, each tuple to include at least three data elements, a second source vector register to store data elements of at least two tuples, each tuple to include at least three data elements, a first logic to extract a respective data element from a specific position within each tuple to be stored in the first source vector register, the specific position to be dependent on an encoding for the instruction, a second logic to extract a respective data element from the specific position within each tuple to be stored in the second source vector register, a third logic to store the data elements to be extracted from the first source vector register in a destination vector register, and a fourth logic to store the data elements to be extracted from the second source vector register in the destination vector register. In combination with any of the above embodiments, the core may further include a third source vector register to store data elements of at least two tuples, each tuple to include at least three data elements, a fifth logic to extract a respective data element from the specific position within each tuple to be stored in the third source vector register, and a sixth logic to store the data elements to be extracted from the third source vector register in the destination vector register. In any of the above embodiments, each tuple to be stored in the first source vector register and in the second source vector register is to represent a data structure, and the data structure is to include at least three data elements of different types. In any of the above embodiments, each tuple to be stored in the first source vector register and in the second source vector register is to include three data elements of different types, data elements to be stored in the same positions within each tuple are to be of the same type, and the encoding for the instruction is to specify the type of the data elements to be extracted. In combination with any of the above embodiments, each tuple to be stored in the first source vector register and in the second source vector register is to include four data elements of different types, data elements to be stored in the same positions within each tuple are to be of the same type, the encoding for the instruction is to specify the specific position within each tuple from which the data elements are to be extracted, and the third logic is to store the data elements to be extracted from the first source vector register in contiguous locations in the destination vector register beginning at a location that is dependent on an offset parameter to be specified for the instruction. In any of the above embodiments, the destination vector register may be one of the source vector registers. In any of the above embodiments, the first source register may also be the destination register. In combination with any of the above embodiments, the core may further include a fifth logic to apply a masking operation when the data elements to be extracted from the first source vector register and the second source vector register are stored in the destination vector register such that, for each of one or more bits in a mask register identified in the instruction that are set, a data element that is to be stored in the destination vector register is to be stored to the destination vector register, and for each of one or more bits in the mask register identified in the instruction that are not set, a data element that would otherwise have been stored to the destination vector register is not to be stored to the destination vector register. In combination with any of the above embodiments, the core may include a fifth logic to apply a masking operation when the data elements to be extracted from the first source vector register and the second source vector register are stored in the destination vector register such that, for each bit that is not set in a mask register identified in the instruction, the masking operation replaces a data element that would otherwise be stored in the destination vector with zeros. In combination with any of the above embodiments, the core may include a fifth logic to apply a masking operation when the data elements to be extracted from the first source vector register and the second source vector register are stored in the destination vector register such that, for each bit that is not set in a mask register identified in the instruction, the masking operation preserves the current value in the location in the destination vector register at which a data element would otherwise have been stored. In combination with any of the above embodiments, the core may include a fifth logic to determine the number of data elements in each tuple, dependent on a parameter value specified for the instruction. In combination with any of the above embodiments, the core may include a fifth logic to determine the number of tuples stored within the first source vector register from which to extract data elements, dependent on a parameter value specified for the instruction. In combination with any of the above embodiments, the core may include a fifth logic to determine the size of the data elements to be extracted from each of the tuples stored within the first source vector register, dependent on a parameter value specified for the instruction. In any of the above embodiments, the core may include a Single Instruction Multiple Data (SIMD) coprocessor to implement execution of the instruction. In any of the above embodiments, the processor may include a vector register file that includes the source vector register.

Some embodiments of the present disclosure include a method. In at least some of these embodiments, the method may include, in a processor, receiving a first instruction, decoding the first instruction, executing the first instruction, and retiring the first instruction. Executing the first instruction may include extracting a respective data element from a specific position within each of multiple data structures stored in a first source vector register, the specific position being dependent on an encoding for the first instruction, extracting a respective data element from the specific position within each of multiple data structures stored in a second source vector register, storing the data elements extracted from the first source vector register in a first destination vector register, storing the data elements extracted from the second source vector register in the first destination vector register, and retiring the instruction. In combination with any of the above embodiments, the method may further include extracting a respective data element from the specific position within each of multiple data structures stored in the third source vector register, and storing the data elements extracted from the third source vector register in the first destination vector register. In any of the above embodiments, each data structure stored in the first source vector register and in the second source vector register may include three data elements of different types, data elements stored in the same positions within each data structure may be of the same type, and the encoding for the instruction may specify the type of the data elements to be extracted. In any of the above embodiments, each data structure stored in the first source vector register and in the second source vector register may include four data elements of different types, data elements stored in the same positions within each data structure may be of the same type, the encoding for the instruction may specify the specific position within each data structure from which the data elements are to be extracted, and storing the data elements extracted from the first and third source vector registers may include storing the data elements extracted from the first and third source vector registers in contiguous locations in the first destination vector register beginning at a location that is dependent on an offset parameter specified for the first instruction. In any of the above embodiments, the destination vector register may be one of the source vector registers. In any of the above embodiments, the first source register may also be the destination register. In combination with any of the above embodiments, the method may include applying a masking operation to the destination vector when it is stored to the destination vector register such that for each of one or more bits in a mask register identified in the instruction that are set, a data element that is to be stored in the destination vector register is to be stored to the destination vector register, and for each of one or more bits in the mask register identified in the instruction that are not set, a data element that would otherwise have been stored to the destination vector register is not to be stored to the destination vector register. In combination with any of the above embodiments, the method may include applying a masking operation to the destination vector when it is stored to the destination vector register such that for each bit that is not set in a mask register identified in the first instruction, the masking operation replaces two or more data elements that are placed next to each other in the destination vector with zeros. In combination with any of the above embodiments, the method may include applying a masking operation to the destination vector when it is stored to the destination vector register such that, for each bit that is not set in a mask register identified in the first instruction, the masking operation preserves the current values in locations in the destination vector register at which two or more data elements that are placed next to each other in the destination vector would otherwise have been written. In combination with any of the above embodiments, the method may include determining the number of data elements in each of the data structures, dependent on a parameter value specified for the first instruction. In combination with any of the above embodiments, the method may include determining the number of data structures within the first source vector register from which to extract data elements, dependent on a parameter value specified for the first instruction. In combination with any of the above embodiments, the method may include determining the size of the data elements to be extracted from each of the data structures stored within the first source vector register, dependent on a parameter value specified for the first instruction. In any of the above embodiments, the processor may include a Single Instruction Multiple Data (SIMD) coprocessor that implements execution of the first instruction. In combination with any of the above embodiments, the method may further include, prior to executing the first instruction, executing a second instruction, including loading data elements of multiple data structures into the first source vector register, each data structure including three data elements of different types, executing a third instruction, including loading data elements of multiple data structures into the second source vector register, each data structure including three data elements of different types, and executing a fourth instruction, including loading data elements of multiple data structures into a third source vector register, each data structure including three data elements of different types. In any of the above embodiments, executing the first instruction may include extracting a respective data element of a first type from the specific position within each of the data structures stored in the three source vector registers, and storing the extracted data elements of the first type in the first destination vector register. In combination with any of the above embodiments, the method may further include, subsequent to executing the first instruction, executing a fifth instruction, including extracting a respective data element of a second type from a position within each of the data structures stored in the three source vector registers that is dependent on an encoding for the fifth instruction, and storing the data elements of the second type in a second destination vector register, and executing a sixth instruction, including extracting a respective data element of a third type from a position within each of the data structures stored in the three source vector registers that is dependent on an encoding for the sixth instruction, and storing the data elements of the third type in a third destination vector register. In combination with any of the above embodiments, the method may further include prior to executing the first instruction, executing a second instruction, including loading data elements of multiple data structures into the first source vector register, each data structure including four data elements of different types, executing a third instruction, including loading data elements of multiple data structures into the second source vector register, each data structure including four data elements of different types, and executing a fourth instruction, including loading data elements of multiple data structures into a third source vector register, each data structure including four data elements of different types, and executing a fifth instruction, including loading data elements of multiple data structures into a fourth source vector register, each data structure including four data elements of different types. In any of the above embodiments, executing the first instruction may include extracting a respective data element of a first type from the specific position within each of the data structures stored in the first and second source vector registers, and storing the data elements of the first type that were extracted from the first and second source vector registers in a lower-order portion of the first destination vector register. In combination with any of the above embodiments, the method may further include, subsequent to executing the first instruction, executing a sixth instruction, including extracting a respective data element of the first type from the specific position within each of the data structures stored in the third and fourth source vector registers, and storing the data elements of the first type that were extracted from the third and fourth source vector registers in a higher-order portion of the first destination vector register, and for each given one of a second data element type, a third data element type, and a fourth data element type, executing a respective pair of instructions. Executing the first instruction of the pair of instructions may include extracting a respective data element of the given data element type from a position within each of the data structures stored in the first and second source vector registers that is dependent on an encoding for the first instruction of the pair of instructions, storing the data elements of the given type that were extracted from the first and second source vector registers in a lower-order portion of a destination vector register for the given data element type. Executing the second instruction of the pair of instructions may include extracting a respective data element of the given data element type from a position within each of the data structures stored in the third and fourth source vector registers that is dependent on an encoding for the second instruction for the second instruction of the pair of instructions, and storing the data elements of the given type that were extracted from the third and fourth source vector registers in a higher-order portion of the destination vector register for the given data element type.

Some embodiments of the present disclosure include a system. In at least some of these embodiments, the system may include a front end to receive an instruction, a decoder to decode the instruction, a core to execute the instruction, and a retirement unit to retire the instruction. To execute the instruction, the core may include a first source vector register to store data elements of at least two tuples, each tuple to include at least three data elements, a second source vector register to store data elements of at least two tuples, each tuple to include at least three data elements, a first logic to extract a respective data element from a specific position within each tuple to be stored in the first source vector register, the specific position to be dependent on an encoding for the instruction, a second logic to extract a respective data element from the specific position within each tuple to be stored in the second source vector register, a third logic to store the data elements to be extracted from the first source vector register in a destination vector register, and a fourth logic to store the data elements to be extracted from the second source vector register in the destination vector register. In combination with any of the above embodiments, the core may further include a third source vector register to store data elements of at least two tuples, each tuple to include at least three data elements, a fifth logic to extract a respective data element from the specific position within each tuple to be stored in the third source vector register, and a sixth logic to store the data elements to be extracted from the third source vector register in the destination vector register. In any of the above embodiments, each tuple to be stored in the first source vector register and in the second source vector register is to represent a data structure, and the data structure is to include at least three data elements of different types. In any of the above embodiments, each tuple to be stored in the first source vector register and in the second source vector register is to include three data elements of different types, data elements to be stored in the same positions within each tuple are to be of the same type, and the encoding for the instruction is to specify the type of the data elements to be extracted. In combination with any of the above embodiments, each tuple to be stored in the first source vector register and in the second source vector register is to include four data elements of different types, data elements to be stored in the same positions within each tuple are to be of the same type, the encoding for the instruction is to specify the specific position within each tuple from which the data elements are to be extracted, and the third logic is to store the data elements to be extracted from the first source vector register in contiguous locations in the destination vector register beginning at a location that is dependent on an offset parameter to be specified for the instruction. In any of the above embodiments, the destination vector register is one of the source vector registers. In any of the above embodiments, the first source register is also the destination register. In combination with any of the above embodiments, the core may further include a fifth logic to apply a masking operation when the data elements to be extracted from the first source vector register and the second source vector register are stored in the destination vector register such that, for each of one or more bits in a mask register identified in the instruction that are set, a data element that is to be stored in the destination vector register is to be stored to the destination vector register, and for each of one or more bits in the mask register identified in the instruction that are not set, a data element that would otherwise have been stored to the destination vector register is not to be stored to the destination vector register. In combination with any of the above embodiments, the core may include a fifth logic to apply a masking operation when the data elements to be extracted from the first source vector register and the second source vector register are stored in the destination vector register such that, for each bit that is not set in a mask register identified in the instruction, the masking operation replaces a data element that would otherwise be stored in the destination vector with zeros. In combination with any of the above embodiments, the core may include a fifth logic to apply a masking operation when the data elements to be extracted from the first source vector register and the second source vector register are stored in the destination vector register such that, for each bit that is not set in a mask register identified in the instruction, the masking operation preserves the current value in the location in the destination vector register at which a data element would otherwise have been stored. In combination with any of the above embodiments, the core may include a fifth logic to determine the number of data elements in each tuple, dependent on a parameter value specified for the instruction. In combination with any of the above embodiments, the core may include a fifth logic to determine the number of tuples stored within the first source vector register from which to extract data elements, dependent on a parameter value specified for the instruction. In combination with any of the above embodiments, the core may include a fifth logic to determine the size of the data elements to be extracted from each of the tuples stored within the first source vector register, dependent on a parameter value specified for the instruction. In any of the above embodiments, the core may include a Single Instruction Multiple Data (SIMD) coprocessor to implement execution of the instruction. In any of the above embodiments, the system may include a processor. In any of the above embodiments, the system may include a vector register file that includes the source vector register.

Some embodiments of the present disclosure include a system for executing instructions. In at least some of these embodiments, the system may include means for receiving a first instruction, decoding the first instruction, executing the first instruction, and retiring the first instruction. The means for executing the first instruction may include means for extracting a respective data element from a specific position within each of multiple data structures stored in a first source vector register, the specific position being dependent on an encoding for the first instruction, means for extracting a respective data element from the specific position within each of multiple data structures stored in a second source vector register, means for storing the data elements extracted from the first source vector register in a first destination vector register, and means for storing the data elements extracted from the second source vector register in the first destination vector register. In combination with any of the above embodiments, the system may further include means for extracting a respective data element from the specific position within each of multiple data structures stored in the third source vector register, and means for storing the data elements extracted from the third source vector register in the first destination vector register. In any of the above embodiments, each data structure stored in the first source vector register and in the second source vector register may include three data elements of different types, data elements stored in the same positions within each data structure may be of the same type, and the encoding for the instruction may specify the type of the data elements to be extracted. In any of the above embodiments, each data structure stored in the first source vector register and in the second source vector register may include four data elements of different types, data elements stored in the same positions within each data structure may be of the same type, the encoding for the instruction may specify the specific position within each data structure from which the data elements are to be extracted, and storing the data elements extracted from the first and third source vector registers may include storing the data elements extracted from the first and third source vector registers in contiguous locations in the first destination vector register beginning at a location that is dependent on an offset parameter specified for the first instruction. In any of the above embodiments, the destination vector register may be one of the source vector registers. In any of the above embodiments, the first source register may also be the destination register. In combination with any of the above embodiments, the system may include means for applying a masking operation to the destination vector when it is stored to the destination vector register such that for each of one or more bits in a mask register identified in the instruction that are set, a data element that is to be stored in the destination vector register is to be stored to the destination vector register, and for each of one or more bits in the mask register identified in the instruction that are not set, a data element that would otherwise have been stored to the destination vector register is not to be stored to the destination vector register. In combination with any of the above embodiments, the system may include means for applying a masking operation to the destination vector when it is stored to the destination vector register such that for each bit that is not set in a mask register identified in the first instruction, the masking operation replaces two or more data elements that are placed next to each other in the destination vector with zeros. In combination with any of the above embodiments, the system may include means for applying a masking operation to the destination vector when it is stored to the destination vector register such that, for each bit that is not set in a mask register identified in the first instruction, the masking operation preserves the current values in locations in the destination vector register at which two or more data elements that are placed next to each other in the destination vector would otherwise have been written. In combination with any of the above embodiments, the system may include means for determining the number of data elements in each of the data structures, dependent on a parameter value specified for the first instruction. In combination with any of the above embodiments, the system may include means for determining the number of data structures within the first source vector register from which to extract data elements, dependent on a parameter value specified for the first instruction. In combination with any of the above embodiments, the system may include means for determining the size of the data elements to be extracted from each of the data structures stored within the first source vector register, dependent on a parameter value specified for the first instruction. In any of the above embodiments, the processor may include a Single Instruction Multiple Data (SIMD) coprocessor that implements execution of the first instruction. In combination with any of the above embodiments, the system may further include means for executing a second instruction prior to executing the first instruction, including means or loading data elements of multiple data structures into the first source vector register, each data structure including three data elements of different types, means for executing a third instruction, including means for loading data elements of multiple data structures into the second source vector register, each data structure including three data elements of different types, and means for executing a fourth instruction, including means for loading data elements of multiple data structures into a third source vector register, each data structure including three data elements of different types. In any of the above embodiments, the means for executing the first instruction may include means for extracting a respective data element of a first type from the specific position within each of the data structures stored in the three source vector registers, and means for storing the extracted data elements of the first type in the first destination vector register. In combination with any of the above embodiments, the system may further include means for executing a fifth instruction subsequent to executing the first instruction, including means for extracting a respective data element of a second type from a position within each of the data structures stored in the three source vector registers that is dependent on an encoding for the fifth instruction, and means for storing the data elements of the second type in a second destination vector register, and means for executing a sixth instruction, including means for extracting a respective data element of a third type from a position within each of the data structures stored in the three source vector registers that is dependent on an encoding for the sixth instruction, and means for storing the data elements of the third type in a third destination vector register. In combination with any of the above embodiments, the system may further include means for executing a second instruction prior to executing the first instruction, including means for loading data elements of multiple data structures into the first source vector register, each data structure including four data elements of different types, means for executing a third instruction, including means for loading data elements of multiple data structures into the second source vector register, each data structure including four data elements of different types, and means for executing a fourth instruction, including means for loading data elements of multiple data structures into a third source vector register, each data structure including four data elements of different types, and means for executing a fifth instruction, including loading data elements of multiple data structures into a fourth source vector register, each data structure including four data elements of different types. In any of the above embodiments, the means for executing the first instruction may include means for extracting a respective data element of a first type from the specific position within each of the data structures stored in the first and second source vector registers. and means for storing the data elements of the first type that were extracted from the first and second source vector registers in a lower-order portion of the first destination vector register. In combination with any of the above embodiments, the system may further include means for executing a sixth instruction, subsequent to executing the first instruction, including means for extracting a respective data element of the first type from the specific position within each of the data structures stored in the third and fourth source vector registers, and means for storing the data elements of the first type that were extracted from the third and fourth source vector registers in a higher-order portion of the first destination vector register, and for each given one of a second data element type, a third data element type, and a fourth data element type, means for executing a respective pair of instructions. The means for executing the first instruction of the pair of instructions may include means for extracting a respective data element of the given data element type from a position within each of the data structures stored in the first and second source vector registers that is dependent on an encoding for the first instruction of the pair of instructions, and means for storing the data elements of the given type that were extracted from the first and second source vector registers in a lower-order portion of a destination vector register for the given data element type. The means for executing the second instruction of the pair of instructions may include means for extracting a respective data element of the given data element type from a position within each of the data structures stored in the third and fourth source vector registers that is dependent on an encoding for the second instruction for the second instruction of the pair of instructions, and means for storing the data elements of the given type that were extracted from the third and fourth source vector registers in a higher-order portion of the destination vector register for the given data element type.

What is claimed is:

1. A processor, comprising:
   a decoder to decode an instruction, the instruction including an opcode and fields to identify a first source vector register, a second source vector register, and a destination vector register;
   the first source vector register to store data elements of at least two tuples, each tuple to include at least three data elements;
   the second source vector register to store data elements of at least two tuples, each tuple to include at least three data elements;
   execution circuitry to execute the decoded instruction, the execution circuitry to:
      extract a respective data element from a specific position within each tuple in the first source vector register, the specific position to be dependent on an encoding for the instruction;
      extract a respective data element from the specific position within each tuple in the second source vector register;

store the data elements to be extracted from the first source vector register and the second source vector register in contiguous locations in the destination vector register; and a retirement unit to retire the executed decoded instruction.

2. The processor of claim 1, wherein:

the instruction further includes a field to identify a third source vector register:

the third source vector register to store data elements of at least two tuples, each tuple to include at least three data elements; and the execution circuitry, in response to the decoded instruction, is further to:

extract a respective data element from the specific position within each tuple stored in the third source vector register; and store the data elements to be extracted from the third source vector register in contiguous locations in the destination vector register.

3. The processor of claim 1, wherein:

each tuple in the first source vector register and in the second source vector register is to represent a data structure, the data structure to include at least three data elements of different types.

4. The processor of claim 1, wherein:

each tuple in the first source vector register and in the second source vector register is to include three data elements of different types;

data elements stored in the same positions within each tuple are to be of the same type; and the encoding for the instruction is to specify the type of the data elements to be extracted.

5. The processor of claim 1, wherein:

each tuple in the first source vector register and in the second source vector register is to include four data elements of different types;

data elements stored in the same positions within each tuple are to be of the same type;

the encoding for the instruction is to specify the specific position within each tuple from which the data elements are to be extracted; and the execution circuitry is further to store the data elements to be extracted from the first source vector register in contiguous locations in the destination vector register beginning at a location dependent on an offset parameter from the encoding for the instruction.

6. The processor of claim 1, wherein:

the execution circuitry is further to apply a masking operation when the data elements to be extracted from the first source vector register and the second source vector register are stored in the destination vector register; and the execution circuitry is further to, based on the masking operation:

store data elements in bits of the destination vector register corresponding to one or more bits that are set in a mask register identified in the instruction; and store zeroes in bits of the destination vector register corresponding to one or more bits that are not set in the mask register identified in the instruction.

7. The processor of claim 1, wherein the instruction is a Single Instruction Multiple Data (SIMD) instruction.

8. A method, comprising, in a processor:

receiving a first instruction including an opcode and fields to identify a first source vector register, a second source vector register, and a first destination vector register;

decoding the first instruction;

executing the decoded first instruction by:

extracting a respective data element from a specific position within each of multiple data structures stored in the first source vector register, the specific position being dependent on an encoding for the first instruction;

extracting a respective data element from the specific position within each of multiple data structures stored in the second source vector register;

storing the data elements extracted from the first source vector register in contiguous locations in the first destination vector register;

storing the data elements extracted from the second source vector register in contiguous locations in the first destination vector register; and retiring the instruction.

9. The method of claim 8, wherein executing the decoded first instruction further comprises:

extracting a respective data element from the specific position within each of multiple data structures stored in the third source vector register; and storing the data elements extracted from the third source vector register in contiguous locations in the first destination vector register.

10. The method of claim 8, wherein:

each data structure stored in the first source vector register and in the second source vector register includes three data elements of different types;

data elements stored in the same positions within each data structure are of the same type; and the encoding for the instruction specifies the type of the data elements to be extracted.

11. The method of claim 8, wherein:

each data structure stored in the first source vector register and in the second source vector register includes four data elements of different types;

data elements stored in the same positions within each data structure are of the same type;

the encoding for the instruction specifies the specific position within each data structure from which the data elements are to be extracted; and storing the data elements extracted from the first and third source vector registers comprises storing the data elements extracted from the first and third source vector registers in contiguous locations in the first destination vector register beginning at a location dependent on an offset parameter from the encoding for the first instruction.

12. The method of claim 8, wherein:

the method further comprises, prior to executing the decoded first instruction:

executing a second instruction, including:

loading data elements of multiple data structures into the first source vector register, each data structure including three data elements of different types;

executing a third instruction, including:

loading data elements of multiple data structures into the second source vector register, each data structure including three data elements of different types; and executing a fourth instruction, including:

loading data elements of multiple data structures into a third source vector register, each data structure including three data elements of different types; and executing the decoded first instruction comprises:
    extracting a respective data element of a first type from the specific position within each of the data structures stored in the three source vector registers; and
    storing the extracted data elements of the first type in contiguous locations in the first destination vector register; and
the method further comprises, subsequent to executing the decoded first instruction:
    executing a fifth instruction, including:
        extracting a respective data element of a second type from a position within each of the data structures stored in the three source vector registers dependent on an encoding for the fifth instruction; and
        storing the data elements of the second type in contiguous locations in a second destination vector register; and
    executing a sixth instruction, including:
        extracting a respective data element of a third type from a position within each of the data structures stored in the three source vector registers dependent on an encoding for the sixth instruction; and
        storing the data elements of the third type in contiguous locations in a third destination vector register.

13. The method of claim 8, wherein:
executing the decoded first instruction further comprises:
    extracting a respective data element of a first type from the specific position within each of the data structures stored in the first and second source vector registers; and
    storing the data elements of the first type that were extracted from the first and second source vector registers in a lower-order portion of the first destination vector register; and
the method further comprises, subsequent to executing the decoded first instruction:
    executing a second instruction, including:
        extracting a respective data element of the first type from the specific position within each of the data structures stored in the third and fourth source vector registers; and
        storing the data elements of the first type that were extracted from the third and fourth source vector registers in a higher-order portion of the first destination vector register; and
    for each given one of a second data element type, a third data element type, and
a fourth data element type, executing a respective pair of instructions, wherein:
    executing the first instruction of the pair of instructions includes:
        extracting a respective data element of the given data element type from a position within each of the data structures stored in the first and second source vector registers dependent on an encoding for the first instruction of the pair of instructions;
        storing the data elements of the given type that were extracted from the first and second source vector registers in a lower-order portion of a destination vector register for the given data element type; and
    executing the second instruction of the pair of instructions includes:
        extracting a respective data element of the given data element type from a position within each of the data structures stored in the third and fourth source vector registers dependent on an encoding for the second instruction of the second instruction of the pair of instructions; and
        storing the data elements of the given type that were extracted from the third and fourth source vector registers in a higher-order portion of the destination vector register for the given data element type.

14. A system, comprising:
a decoder to decode an instruction, the instruction including an opcode and fields to identify a first source vector register, a second source vector register, and a destination vector register;
the first source vector register to store data elements of at least two tuples, each tuple to include at least three data elements;
the second source vector register to store data elements of at least two tuples, each tuple to include at least three data elements;
execution circuitry to execute the decoded instruction, the execution circuitry to:
    extract a respective data element from a specific position within each tuple stored in the first source vector register, the specific position to be dependent on an encoding for the instruction;
    extract a respective data element from the specific position within each tuple stored in the second source vector register;
    store the data elements to be extracted from the first source vector register in contiguous locations in the destination vector register;
    store the data elements to be extracted from the second source vector register in contiguous locations in the destination vector register; and
a retirement unit to retire the decoded instruction.

15. The system of claim 14, wherein:
the instruction further includes a field to identify a third source vector register:
    the third source vector register to store data elements of at least two tuples, each tuple to include at least three data elements; and
the execution circuitry, in response to the decoded instruction, is further to:
    extract a respective data element from the specific position within each tuple stored in the third source vector register;
    store the data elements to be extracted from the third source vector register in contiguous locations in the destination vector register.

16. The system of claim 14, wherein:
each tuple stored in the first source vector register and in the second source vector register is to represent a data structure, the data structure to include at least three data elements of different types.

17. The system of claim 14, wherein:
each tuple stored in the first source vector register and in the second source vector register is to include three data elements of different types;
data elements stored in the same positions within each tuple are to be of the same type; and
the encoding for the instruction is to specify the type of the data elements to be extracted.

18. The system of claim 14, wherein:
each tuple stored in the first source vector register and in the second source vector register is to include four data elements of different types;

data elements stored in the same positions within each tuple are to be of the same type;

the encoding for the instruction is to specify the specific position within each tuple from which the data elements are to be extracted; and the execution circuitry is further to store the data elements to be extracted from the first source vector register in contiguous locations in the destination vector register beginning at a location dependent on an offset parameter from the encoding for the instruction.

19. The system of claim 14, wherein:

the execution circuitry is further to apply a masking operation when the data elements to be extracted from the first source vector register and the second source vector register are stored in the destination vector register; and the execution circuitry is further to, based on the masking operation:
  store data elements in bits of the destination vector register corresponding to one or more bits that are set in a mask register identified in the instruction; and
  store zeroes in bits of the destination vector register corresponding to one or more bits that are not set in the mask register identified in the instruction.

20. The system of claim 14, wherein the instruction is a Single Instruction Multiple Data (SIMD) instruction.

* * * * *